US008052523B2

(12) United States Patent
Inamura

(10) Patent No.: US 8,052,523 B2
(45) Date of Patent: Nov. 8, 2011

(54) GAMING SYSTEM

(75) Inventor: Yukinori Inamura, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1112 days.

(21) Appl. No.: 11/892,383

(22) Filed: Aug. 22, 2007

(65) Prior Publication Data

US 2008/0242392 A1 Oct. 2, 2008

(30) Foreign Application Priority Data

Aug. 23, 2006 (JP) ................................ 2006-226828

(51) Int. Cl.
*A63F 9/24* (2006.01)
*A63F 13/00* (2006.01)

(52) U.S. Cl. ................. 463/27; 463/25; 463/26; 463/28

(58) Field of Classification Search ............... 463/25–28
See application file for complete search history.

(56) References Cited

U.S. PATENT DOCUMENTS 4,837,728 A 6/1989 Barrie et al.
5,326,104 A * 7/1994 Pease et al. ..................... 463/18
5,505,461 A * 4/1996 Bell et al. ........................ 463/25
5,570,885 A * 11/1996 Ornstein ......................... 463/27
6,312,333 B1 * 11/2001 Acres .............................. 463/25
6,840,857 B2 * 1/2005 Ghela ............................. 463/17
7,871,323 B2 * 1/2011 Walker et al. ................... 463/16
2003/0045339 A1 * 3/2003 Ghela ............................. 463/17
2003/0083126 A1 * 5/2003 Paulsen ........................... 463/25
2004/0110554 A1 * 6/2004 Bromfield ........................ 463/17
2004/0110556 A1 * 6/2004 Bromfield ........................ 463/25
2004/0235551 A1 * 11/2004 Walker et al. ................... 463/16
2005/0153771 A1 * 7/2005 Ghela ............................. 463/17
2005/0153774 A1 * 7/2005 Okada ............................. 463/25
2006/0205494 A1 * 9/2006 Fujimoto ......................... 463/29
2006/0287045 A1 * 12/2006 Walker et al. ................... 463/16
2007/0004505 A1 * 1/2007 Walker et al. ................... 463/26
2007/0135206 A1 * 6/2007 Inamura .......................... 463/20
2008/0070700 A1 * 3/2008 Inamura .......................... 463/42
2008/0242392 A1 * 10/2008 Inamura .......................... 463/17

FOREIGN PATENT DOCUMENTS

JP 2005-168755 6/2005
JP 2005-192991 7/2005

* cited by examiner

*Primary Examiner* — Melba Bumgarner
*Assistant Examiner* — Steven J Hylinski
(74) *Attorney, Agent, or Firm* — McGinn Intellectual Property Law Group, PLLC

(57) ABSTRACT

A gaming system comprising: a gaming machine and a server capable of communicating with the gaming machine is provided. The gaming machine comprises a receiving unit for receiving a game medium. The server comprises a plurality of first storage devices for storing a plurality of accumulated amounts to which predetermined proportions of bet game media received by the receiving unit is cumulatively added, a first lottery unit for conducting a lottery to determine whether or not one of the accumulated amounts is to be paid, and a first processor that operates to transmit an instruction for payout based on a result of the lottery and reset all accumulated amounts stored in the plurality of first storage devices when the instruction for payout is transmitted based on the result of the lottery.

8 Claims, 17 Drawing Sheets

Fig. 2

| | Left Reel | Center Reel | Right Reel |
|---|---|---|---|
| Code No. | Symbol | Symbol | Symbol |
| 00 | JACKPOT 7 | JACKPOT 7 | JACKPOT 7 |
| 01 | PLUM | BELL | CHERRY |
| 02 | ORANGE | APPLE | ORANGE |
| 03 | PLUM | BELL | APPLE |
| 04 | ORANGE | CHERRY | ORANGE |
| 05 | PLUM | ORANGE | PLUM |
| 06 | ORANGE | PLUM | ORANGE |
| 07 | PLUM | CHERRY | PLUM |
| 08 | BLUE 7 | BELL | ORANGE |
| 09 | CHERRY | APPLE | PLUM |
| 10 | ORANGE | BELL | ORANGE |
| 11 | BELL | STRAWBERRY | PLUM |
| 12 | ORANGE | PLUM | BELL |
| 13 | STRAWBERRY | BLUE 7 | STRAWBERRY |
| 14 | BLUE 7 | BELL | BLUE 7 |
| 15 | ORANGE | APPLE | BELL |
| 16 | APPLE | BELL | CHERRY |
| 17 | PLUM | STRAWBERRY | PLUM |
| 18 | ORANGE | PLUM | ORANGE |
| 19 | PLUM | CHERRY | PLUM |
| 20 | BLUE 7 | BELL | ORANGE |
| 21 | CHERRY | APPLE | PLUM |

Fig. 8

| Winning combination | | | Probability of winning (%) | Base payout amount | Special payout amount |
|---|---|---|---|---|---|
| JACKPOT 7 | JACKPOT 7 | JACKPOT 7 | 0.5 | Accumulated payout amount | 1199 |
| BLUE 7 | BLUE 7 | BLUE 7 | 0.8 | Accumulated payout amount | 1199 |
| BELL | BELL | BELL | 1.1 | Accumulated payout amount | 1199 |
| APPLE | APPLE | APPLE | 1.3 | Accumulated payout amount | 1199 |
| CHERRY | CHERRY | CHERRY | 1.5 | Accumulated payout amount | 1199 |
| STRAWBERRY | STRAWBERRY | STRAWBERRY | 1.5 | 5 | 1199 |
| PLUM | PLUM | PLUM | 1.8 | 4 | 1199 |
| ORANGE | ORANGE | ORANGE | 2.3 | 3 | 1199 |
| CHERRY | CHERRY | (ANY) | 3.0 | 2 | 1199 |
| ORANGE | ORANGE | (ANY) | 3.0 | 2 | 1199 |
| CHERRY | (ANY) | (ANY) | 7.5 | 1 | 1199 |
| ORANGE | (ANY) | (ANY) | 7.5 | 1 | 1199 |

GAMING SYSTEM

CROSS REFERENCE TO RELATED APPLICATIONS

This application is based upon and claims the benefits of priorities from Japanese Patent Application No. 2006-226828 filed on Aug. 23, 2006, the entire contents of which are incorporated herein by reference.

FIELD OF THE INVENTION

The present invention relates to a gaming machine and a gaming system comprising: the gaming machine and a server, and more specifically it relates to a gaming system that may pay out such a high amount that a tax payment may be necessary.

RELATED ART

Conventionally, there are many gaming machines that pay out game media such as medals and coins in responsive to a lottery result. For example, a card game machine in which card games such as poker and black jack are played as the card images are displayed, and a slot machine in which a plurality of kinds of symbols are displayed variably and stopped to appear along a pay line such that if the combination of symbols along the pay line coincides with a predetermined winning combination, some payout amount is paid out to the game player. In these gaming machines, the game player tends to expect a higher amount of payout in playing the game.

Here, in the gaming system comprising: such a gaming machine and a server, a high amount of payout may be conducted under various kinds of conditions. One of such modes includes so-called JACKPOT in which a predetermined percentage of wagers are accumulated for each game and the total accumulated amount of payout is awarded to a game player when a predetermined condition (e.g., a specific combination of symbols) is displayed statically.

Also, another gaming system may have a plurality of JACKPOTs. In the gaming system, the game player who satisfies a predetermined condition may get one out of a plurality of JACKPOTs and only the one JACKPOT is reset such that the counter value of the exact JACKPOT is initialized once the payout is conduced.

In such a gaming system, if a high amount of payout is provided to the game player, tax may be imposed on the payout amount with some tax percentage (e.g., 30% of the payout amount) if the payout amount exceeds a certain reference amount (e.g., $1200) depending on the country or the region in which the gaming machine is installed. In such a case, the game player must conduct a predetermined procedure with respect to the tax payment. In such a case, the game player may calm down from the excitement of obtaining a large amount of payout during the tax payment procedure such that the player may lose an excited feeling. Further, since the maintenance crews conduct a management of the gaming system after the high amount of payout is actually paid such that the player may lose an excited feeling toward the game when the player tries to resume the game.

In this point, even though the above mentioned gaming system has a plurality of JACKPOTs, the player may lose the excited feeling since the management crews conduct a management work to the gaming system after a large amount of payout is made by one of the JACKPOTs.

Therefore, the gaming machine disclosed in JP-A-2005-168755 and JP-A-2005-192991 may try to maintain the amusement of the game by executing the tax payment procedure very quickly. In these gaming machines, when a high amount of payout that requires tax payment is won, the tax payment is conducted between the game player and the gaming machine so as not to wait for an attendant of a casino or the like, which may include a game hall, game center, arcade, and so on, and enable a quick tax payment procedure and try to keep the game player's interest.

And, a plurality of kinds of cumulatively adding means (so-called JACKPOT) are provided in U.S. Pat. No. 4,837,728 and a gaming system comprising a plurality of gaming machines is disclosed.

SUMMARY OF THE INVENTION

Even in the abovementioned invention, the player may lose the interest toward the game if a completely different work intervenes during the game play. The present invention is conceived under such background.

A gaming system comprising a gaming machine and a server capable of communicating with the gaming machine is provided. The gaming machine comprises a receiving unit for receiving a game medium. The server comprises a plurality of first storage devices for storing a plurality of accumulated amounts to which predetermined proportions of bet game media received by the receiving unit is cumulatively added; a first lottery unit for conducting a lottery to determine whether or not one of the accumulated amounts that are stored in the plurality of first storage devices is paid; and a first processor that operates to: a) transmit an instruction to pay out the one of the accumulated amounts stored in the plurality of first storage devices based on a result of the lottery conducted by the first lottery unit and b) reset all accumulated amounts stored in the plurality of first storage devices when the one of the accumulated amounts stored in the first storage devices is paid out based on the result of the lottery conducted by the first lottery unit.

Further features of the present invention, its nature, and various advantages will be more apparent from the accompanying drawings and the following description of the preferred embodiment.

BRIEF DESCRIPTION OF THE DRAWINGS

FIG. 2 is a schematic view showing symbol arrays drawn on outer circumferences of respective reels.

FIG. 8 shows a table illustrating winning probability and payout rate for each winning combination in the slot machine according to the present embodiment.

DESCRIPTION OF THE PREFERRED EMBODIMENT

In the following, an embodiment in which a gaming machine and a gaming system are embodied using a slot machine 1 according to the present invention is described in detail with reference to the drawings.

The slot machine 1 and a gaming system 105 according to the present embodiment is provided with a so-called progressive function to accumulate part (for example, 1% to 5%) of coins bet to a game for a JACKPOT, and to pay a high amount of payout at one time to a game player who plays the game with the slot machine 1 when a predetermined payout condition is satisfied. A plurality of slot machines 1 are individually connected to a server 100 to perform control of the JACKPOT, thereby constituting the gaming system 105 (refer to FIG. 4A).

The gaming system 105 according to the present embodiment is assumed to be installed in a country or a region where the tax liability of an amount equivalent to 30% of an amount of payout is imposed when the amount of payout to be paid out in one game reaches 1200 dollars or more. In addition, in the present embodiment, an amount to be actually paid out to the game player is referred to as a paid amount, and an amount to be paid based on the winning combination upon winning of it, although the amount itself still is not fixed, is referred to as the amount of payout.

Figure 1:
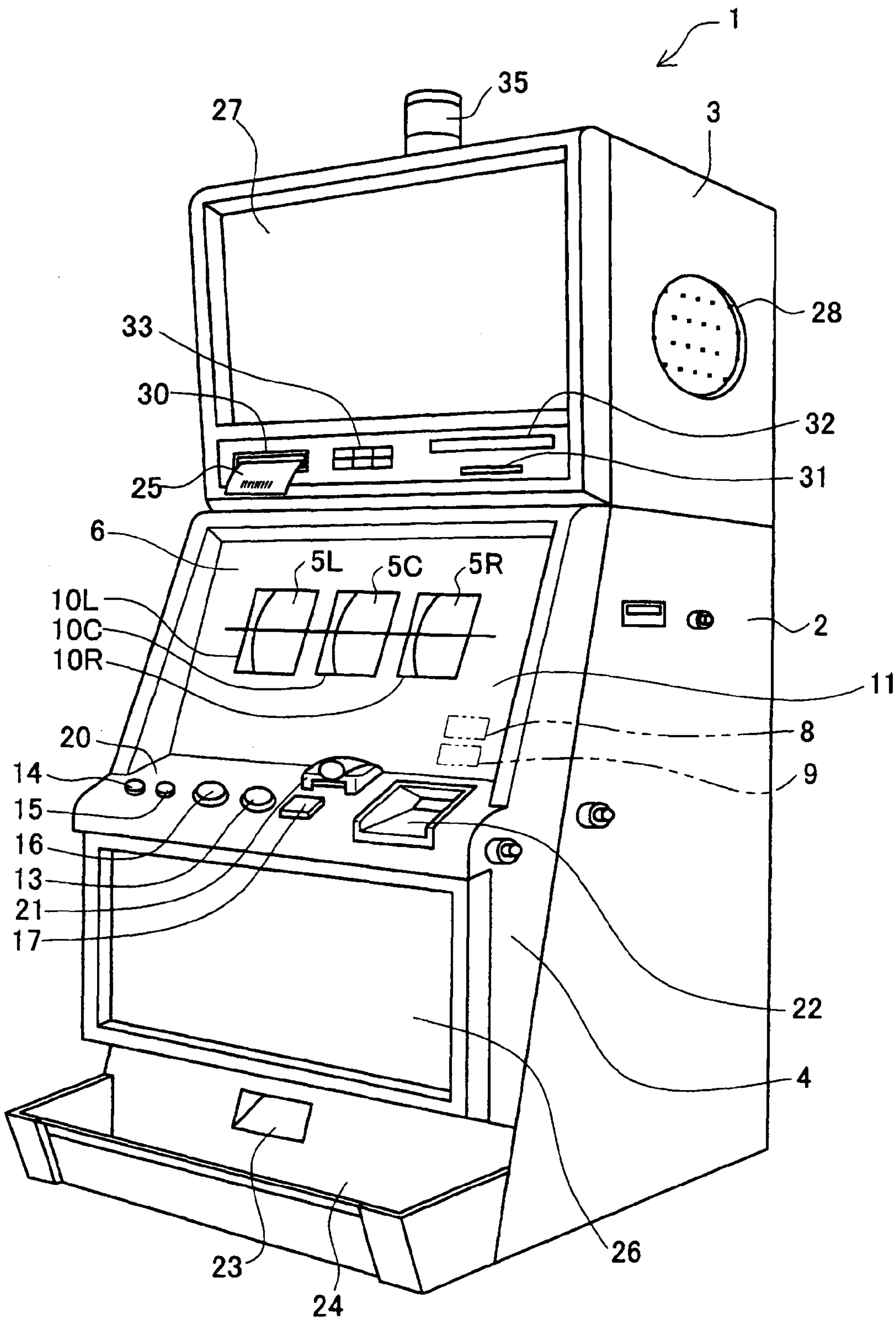
FIG. 1 is a perspective view showing an outer appearance of a slot machine according to the present embodiment.

First, a schematic configuration of the slot machine 1 according to the present embodiment is described in detail with reference to the drawings. FIG. 1 is an external perspective view of the slot machine 1 according to the present embodiment.

The slot machine 1 according to the present embodiment comprises: a cabinet 2, a top box 3 placed in an upper part of the cabinet 2, and a main door 4 provided on the front face of the cabinet 2. Three reels 5L, 5C, and 5R are rotatably provided in the inside of the cabinet 2. An array of symbols (refer to FIG. 2) comprising 22 designs (hereinafter also referred to as symbols) are drawn on the outer circumferential surface of each of the reels 5L, 5C, and 5R.

A lower image display panel 6 is provided in front of each of the reels 5L, 5C, and 5R in the main door 4. The lower image display panel 6 is provided with a transparent liquid crystal panel on which various kinds of information, effect images, and the like relating to the game are displayed during the game play.

Further, a touch panel 11 is provided on the front surface of the lower image display panel 6 (refer to FIG. 3A), and the game player can operate the touch panel 11 to input various kinds of instructions. In this regard, an operation relating to a double-up game or the like to be described later is performed by operating a corresponding portion of the touch panel 11.

A credit number display part 8 and a payout number display part 9 are provided in the lower image display panel 6. A credit number currently owned by the game player is displayed on the credit number display part 8. The amount of payout to be paid out when a combination of symbols stopped and displayed statically along a pay line L matches a predetermined combination is displayed on the payout number display part 9 as a payout number.

Also, three display windows 10L, 10C, and 10R through which the back side can be visually recognized are formed in the lower image display panel 6, and three symbols drawn on each of the outer circumferential surfaces of the reels 5L, 5C, and 5R are displayed through each of the display windows 10L, 10C, and 10R. And, one pay line L which crosses horizontally the three display windows 10L, 10C, and 10R is formed on the lower image display panel 6. The pay line L defines the combination of symbols.

A control panel 20 on which a plurality of buttons are arranged for the game player to input instructions related to a game progression, a coin receiving opening 21 through which a coin as a game medium is received and directed into the cabinet 2, and a bill validator 22 are provided below the lower image display panel 6.

A spin button 13, a change button 14, a CASHOUT button 15, a 1-BET button 16, and a MAX BET button 17 are provided on the control panel 20. The spin button 13 is operating means for inputting an instruction to start the rotation of reels 5L, 5C, and 5R. The change button 14 is operating means used when an attendant of a casino or the like is asked for exchanging money. The CASHOUT button 15 is operating means for inputting an instruction to pay out the number of coins corresponding to the credit number owned by the game player (one credit corresponds to one coin) from a coin payout opening 23 to a coin tray 24 or for paying out a ticket 25 with a bar code to be described later.

The 1-BET button 16 is operating means for the slot machine to receive an instruction to bet one credit on a game from among the number of credits owned by the game player. The MAX BET button 17 is operating means for the slot machine to receive an instruction to bet the maximum credit number on a game which can be bet for one game (50 of the credit number in the present embodiment) from among the number of credits owned by the game player.

A reverter 21S and a coin counter 21C (refer to FIG. 3A) are provided in the inside of the coin receiving opening 21. Then, the reverter 21S directs to the coin payout opening 23 what is other than the validated coins having been received into the coin receiving opening 21 and checked with the validity so as to discharge what is other than the validated coins. The coin counter 21C also detects received and validated coins to count the number of such coins.

The bill validator 22 checks the suitability of bills and receives authentic bills into the cabinet 2. Then, bills inserted into the cabinet 2 are converted into the number of coins, and the equivalent number of credits to the number of converted coins are added as credits owned by the game player. In addition, the bill validator 22 is configured to be capable of reading the ticket 25 with a bar code to be described later. A belly glass 26 on which characters and the like of the slot machine 1 are drawn is provided on the lower front face of the main door 4, that is, below the control panel 20.

In the slot machine 1 according to the present embodiment, coins, bills, or electronic valuable information (credit) equivalent thereto are used as game media. However, the game media applicable to the present invention are not limited thereto, but medals, tokens, electronic money, and tickets, for example, can be applied.

An upper image display panel 27 is provided on the front face of the top box 3. The upper image display panel 27 is provided with a liquid crystal panel which displays game information such as a currently accumulated amount of JACKPOT and a description of the game contents. A speaker 28 for outputting sounds is provided on the side face of the top box 3.

Further, a ticket printer 30, a card reader 31, a data indicator 32, and a keypad 33 are provided below the upper image display panel 27.

Here, the ticket printer 30 is a printing device for outputting the ticket 25 with a bar code and a receipt related to a tax payment to be described later. The ticket 25 with the bar code is a ticket having a bar code printed thereon in which data such as a credit number, date and time, and an identification number of the slot machine 1 is encoded. Then, the game player can play the game with another gaming machine by causing the other gaming machine to read the output ticket 25 with the bar code. The receipt can be used in a procedure at a prescribed place of the casino or the like.

The card reader 31 reads data from and writes data on a smart card. The smart card is a card owned by the game player, which, for example, stores data concerning the history of games having been played by the game player.

The data indicator 32 comprises: a fluorescent display or the like, which, for example, displays data read by the card reader 31 and data input by the game player via the keypad 33. The keypad 33 is used for inputting an instruction and data concerning a ticket issue and the like. Further, a lamp 35 is provided on the top face of the top box 3. The lamp 35 is turned on in a predetermined lighting mode to call an attendant or the like of the casino or the like for help when any error occurs in the slot machine 1 or the like.

Subsequently, based on FIG. 2, the symbols drawn on the outer circumferential surface of each of the reels 5L, 5C, and 5R, which are variably displayed via the display windows 10L, 10C, and 10R of the lower image display panel 6 as the screen is scrolled during the game, are described. FIG. 2 is a schematic diagram showing the arrays of symbols drawn on the outer circumferential surfaces of the respective reels 5L, 5C, and 5R.

On the outer circumferential surfaces of the left reel 5L, the middle reel 5C, and the right reel 5R, arrays having twenty two (22) symbols are drawn, respectively. Each array of symbols is formed by combining the symbols of “JACKPOT 7”, “BLUE 7”, “BELL”, “CHERRY”, “STRAWBERRY”, “PLUM”, “ORANGE”, and “APPLE”. As shown in FIG. 2, prescribed kinds of symbols are arranged in a designated order on the respective reels 5L, 5C, and 5R.

When three symbols of “STRAWBERRY”, “PLUM”, and “ORANGE” are stopped and displayed statically along the pay line L, the amount of payout calculated based on a base amount of payout to be described later is provided to the game player in principle (refer to FIG. 8). As to “CHERRY” and “ORANGE”, the amount of payout calculated based on the base amount of payout corresponding to the number of symbols is provided to the game player even when one or two of the above symbols are stopped and displayed statically along the pay line (refer to FIG. 8).

As mentioned above, the slot machine 1 according to the present embodiment is provided with a so-called progressive function so as to accumulate part (for example, 1% to 5%) of coins bet for each game for the JACKPOT such that a high amount of payout is paid at one time to the game player who plays the game with the slot machine 1 satisfying a predetermined payout condition.

In this regard, as shown in FIG. 8, each winning combination of “JACKPOT 7”, “BLUE7”, “BELL”, “APPLE”, and “CHERRY” satisfies the predetermined payout condition.

For example, in a case where three (3) symbols of “JACKPOT 7” are stopped and displayed statically along the pay line L, the winning combination of the above-mentioned “JACKPOT 7” is satisfied. In this case, at the time of occurrence, an accumulated amount of JACKPOT, which is stored in an accumulated JACKPOT amount storage area 103A of “JACKPOT 7” in which 5% of the bet coins for each game is saved cumulatively, is provided to the game player as the payout.

Also, a case of each winning combination of “BLUE 7”, “BELL”, “APPLE”, and “CHERRY” is basically the same as that of “JACKPOT 7” such that the accumulated JACKPOT amount stored in the accumulated JACKPOT amount storage area 103A corresponding to each winning combination is paid out at the time of occurrence. In the case of each winning combination of “BLUE 7”, “BELL”, “APPLE”, and “CHERRY”, each ratio of the additional amount to the number of coins bet for each game differs in each case.

Specifically, in the case of the winning combination of “BLUE7”, an additional amount corresponding to 4% of coins having been bet for each game is accumulated, and in the case of the winning combination of “BELL”, an additional amount corresponding to 3% of coins having been bet for each game is accumulated. In the case of the winning combination of “APPLE”, it is prescribed such that an additional amount corresponding to 2% of coins bet for each game is accumulated, and in the case of the winning combination of “CHERRY”, an additional amount corresponding to 1% of coins bet for each game is accumulated.

Figure 4A:
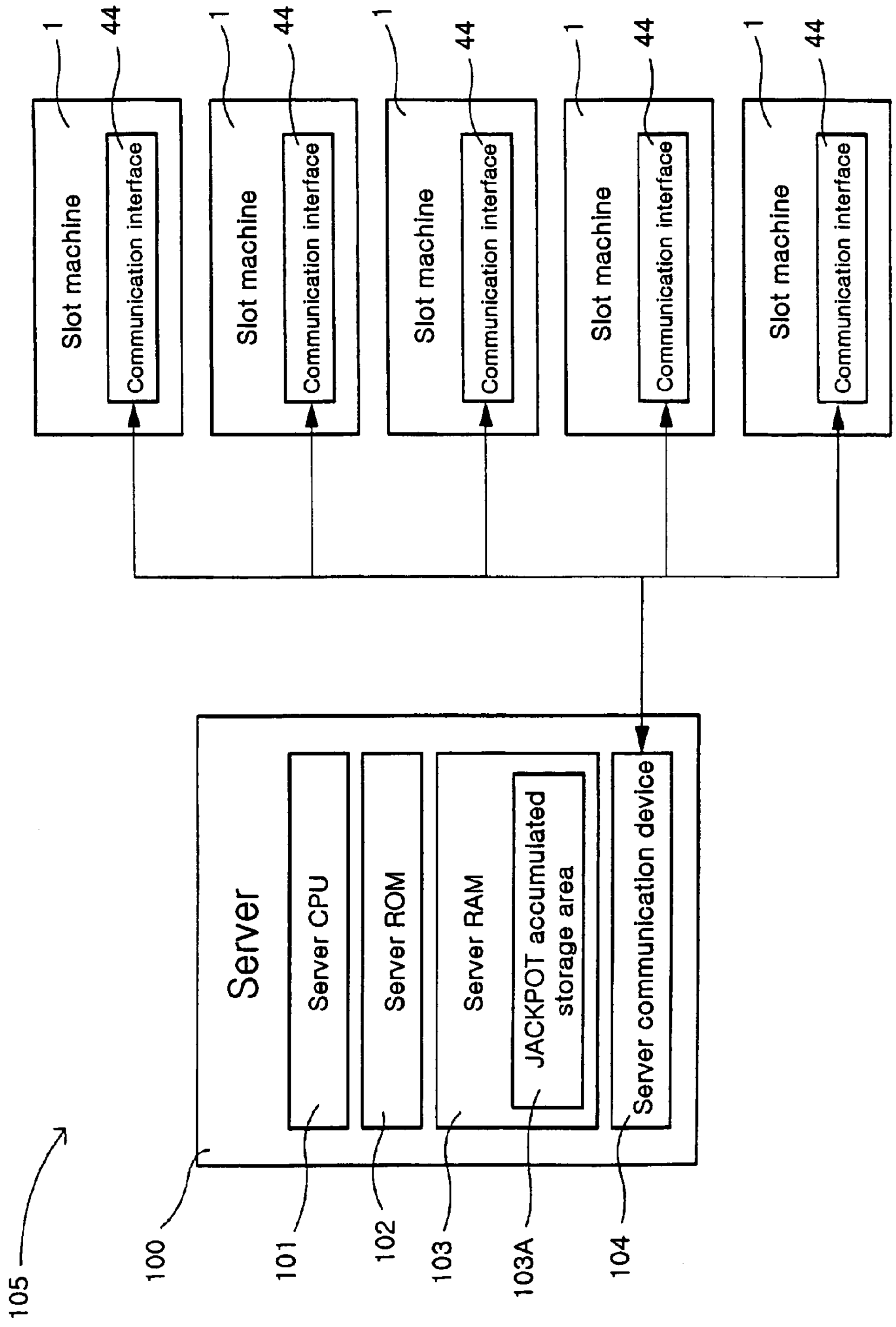
FIG. 4A is a block diagram showing a control system of the gaming system according to the present embodiment.
Figure 4B:
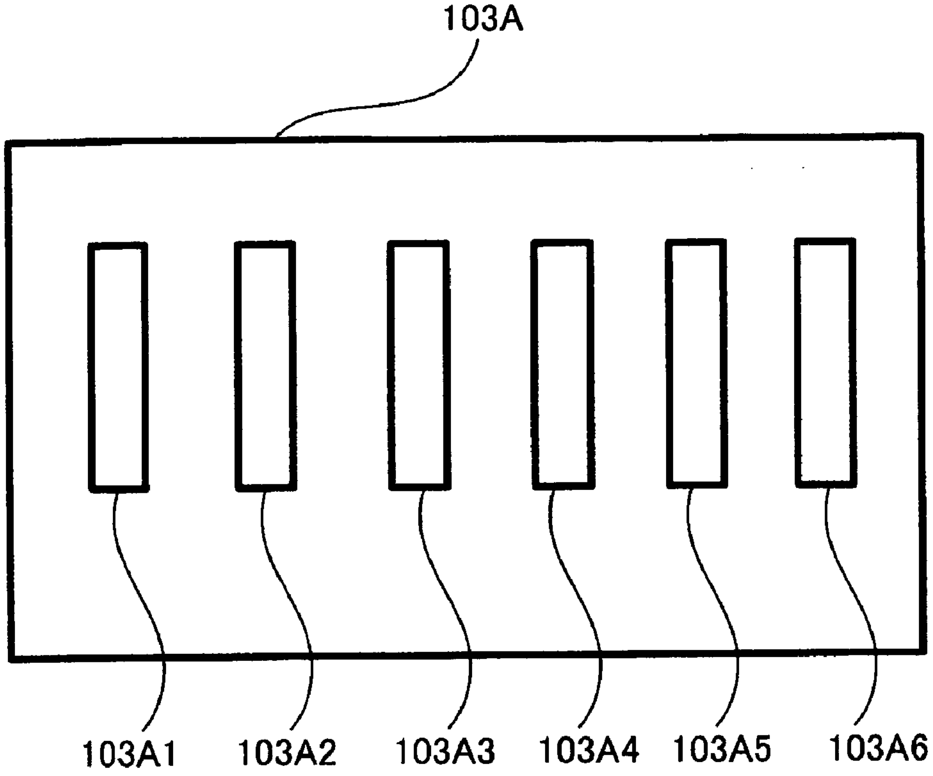
FIG. 4B is a block diagram showing an accumulated JACKPOT amount storage area in detail according to the present embodiment.

FIG. 4B shows storage areas which store accumulated amounts for respective kinds of JACKPOT implemented or included in the accumulated JACKPOT amount storage area 103A. The accumulated amount for “JACKPOT 7”, for which 5% of bet amount is cumulatively added, is stored and updated in area 103A1. The accumulated amount for “BLUE 7”, for which 4% of bet amount is cumulatively added, is stored and updated in area 103A2. The accumulated amount for “BELL”, for which 3% of bet amount is cumulatively added, is stored and updated in area 103A3. The accumulated amount for “APPLE”, for which 2% of bet amount is cumulatively added, is stored and updated in area 103A4. The accumulated amount for "CHERRY", for which 1% of bet amount is cumulatively added, is stored and updated in area 103A5. In JACKPOT lottery process (refer to FIG. 9, S104) to be described later, the JACKPOT may be won and the accumulated amount is also stored and updated in area 103A6.

When the spin button 13 is pressed after a bet number is fixed by the operation of the 1-BET button 16 or the MAX BET button 17, arrays of symbols drawn on the respective reels 5L, 5C, and 5R as shown in FIG. 2 are displayed variably in a downwardly scrolling manner in the display windows 10L, 10C, and 10R with the rotation of the reels 5L, 5C, and 5R. Then, the arrays of symbols are stopped and displayed statically in the display windows 10L, 10C, and 10R when the reels 5L, 5C, and 5R come to a halt after a predetermined period of time elapses. Further, various kinds of winning combinations (refer to FIG. 8) are defined in advance based on respective combinations of symbols and when a combination of symbols corresponding to one of the winning combinations stops along the pay line L, the amount of payout corresponding to the stopped winning combination is provided to the game player.

Figure 3A:
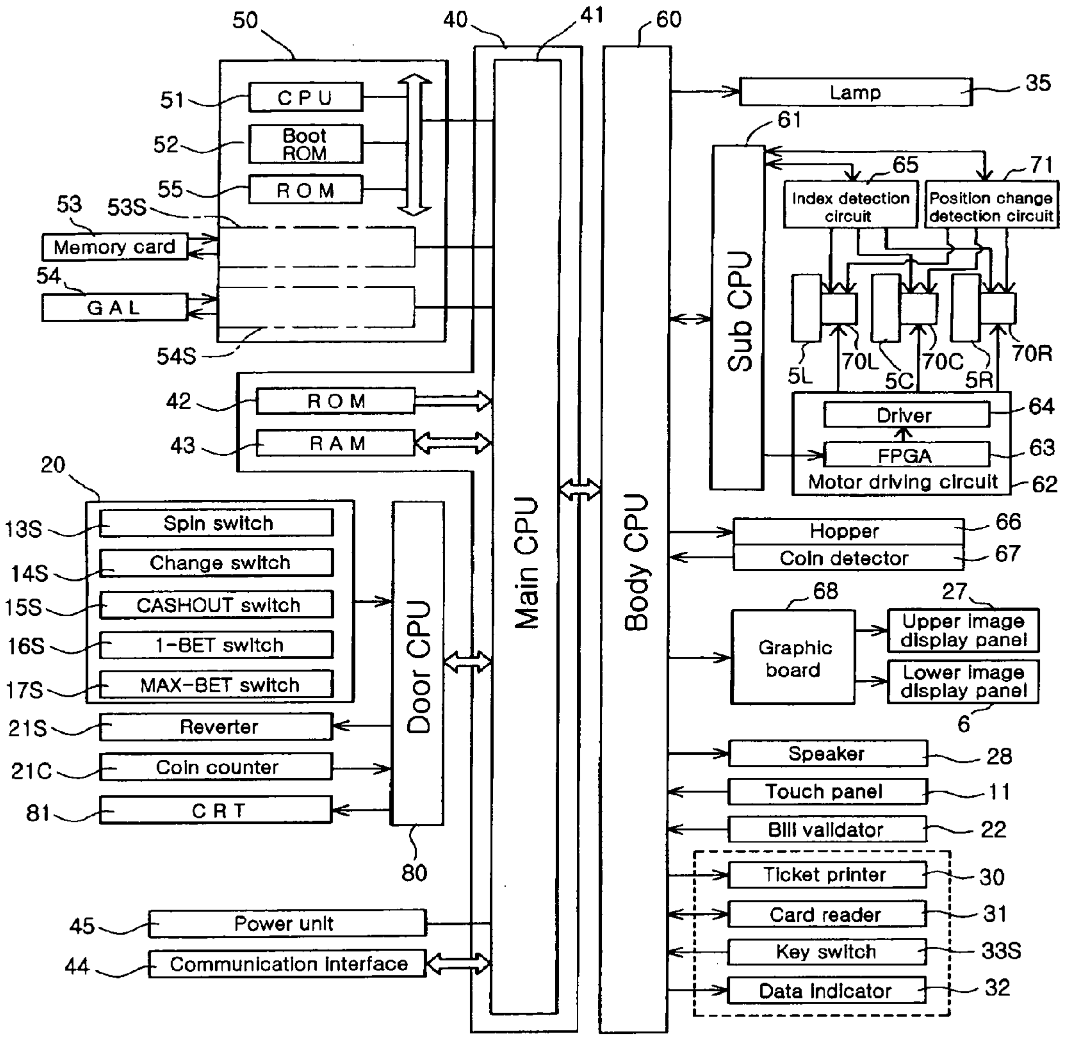
FIG. 3A is a block diagram showing a control system of the slot machine according to the present embodiment.

Next, a configuration of the control system of the slot machine 1 according to the present embodiment is described based on FIG. 3A. FIG. 3A is a block diagram schematically showing the control system of the slot machine 1 according to the present embodiment.

As shown in FIG. 3A, the control system of the slot machine 1 basically comprises: a mother board 40 and a gaming board 50.

First, the gaming board 50 is explained. The gaming board 50 is provided with a CPU 51, a ROM 55, and a boot ROM 52 connected to each other via an internal bus; a card slot 53S corresponding to a memory card 53; and an IC socket 54S corresponding to a GAL 54 (Generic Array Logic).

Figure 3B:
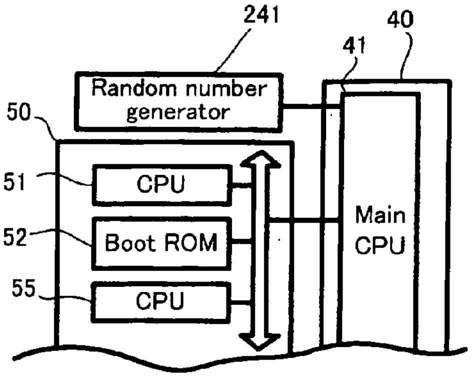
FIG. 3B is an enlarged partial block diagram showing a modified control system.

FIG. 3B shows a modified control system which can be applied to the present embodiment. A random number generator 241 is provided so as to be capable of communicating with the main CPU 41. The random number generator may be utilized for a lottery.

The memory card 53 is constituted of a non-volatile memory and is a recording medium in which game programs and a game system program (hereinafter referred to as the game program and the like) are recorded. The game programs recorded in the memory card 53 include a lottery program. This lottery program is a program for determining the symbols (respective code numbers corresponding to the symbols) of each of the reels 5L, 5C, and 5R stopped and displayed statically along the pay line L. Further, the lottery program includes symbol weighting data corresponding to each of a plurality of kinds of payout rates (for example, 80%, 84%, and 88%). The symbol weighting data indicates the correspondence relationship between the code number of each symbol (refer to FIG. 2) and one or more random number values belonging to a predetermined numeric value range (0 to 255) about each of the three reels 5L, 5C, and 5R. That is, one or more random number values are associated with the code number of one symbol, and when a random number is drawn by lottery, a symbol specified by the random number value is stopped and displayed statically.

The payout rate is defined based on payout rate setting data output from the GAL 54 and a lottery is performed based on the symbol weighting data corresponding to the payout rate.

The card slot 53S is configured such that the memory card can be inserted and removed and is connected to the mother board 40 via an IDE bus. Therefore, kinds and contents of the games to be played on the slot machine 1 can be changed by rewriting the memory card 53 or replacing the memory card 53 itself.

In addition, the game program includes a program related to the game progress, image data and sound data output during the game play, image data and sound data as data for notification, and the like.

The GAL 54 is a kind of a PLD (programmable logic device) having an OR-fixed type array structure. The GAL 54 is provided with a plurality of input ports and output ports, and when predetermined data is input into an input port, the GAL 54 outputs data corresponding to the data from an output port. The data output from this output port is the above-mentioned payout rate setting data.

The IC socket 54S is configured such that the GAL 54 can be inserted and removed, and is connected to the mother board 40 via a PCI bus. Therefore, the payout rate setting data output from the GAL 54 can be changed by rewriting the GAL 54 or replacing the GAL 54 itself.

The CPU 51, the ROM 55, and the boot ROM 52 mutually connected via the internal bus are connected to the mother board 40 via the PCI bus. The PCI bus transfers signals between the mother board 40 and the gaming board 50, and supplies power from the mother board 40 to the gaming board 50. The ROM 55 stores country identification information and an authentication program. The boot ROM 52 stores a preliminary authentication program, a program (boot code) for the CPU 51 to activate the preliminary authentication program and the like.

The authentication program is a program for authenticating the game program and the like (an alteration check program). The authentication program is described in accordance with the alteration check procedure of the game program and the like to be subjected to authentication loading process. The preliminary authentication program is a program for authenticating the authentication program, and is described in accordance with the alteration check procedure of the authentication program to be subjected to authentication process.

Subsequently, the mother board 40 is explained. The mother board 40 is formed using a commercially available general-purpose mother board (a printed wiring board on which the basic components of a personal computer are mounted), and is provided with a main CPU 41, a ROM 42, a RAM 43, and a communication interface 44.

The ROM 42 comprises: a memory device such as a flash memory, and stores programs such as a BIOS executed by the main CPU 41 and permanent data. When the BIOS is executed by the main CPU 41, an initialization process is applied to prescribed peripheral devices, and the loading process of the game program and the like stored in the memory card 53 is started via the gaming board 50.

The RAM 43 stores data and programs used when the main CPU 41 operates. The RAM 43 can also store a variety of information such as a credit number or the like owned by the game player; various kinds of programs such as a game program, the authentication program, which are read out through the gaming board 50; and the like. Further, the RAM 43 stores data (for example, a standard amount of accumulated payout, the amount of special payout, and the like based on a JACKPOT accumulated amount) sent from the server 100 connected via a communication interface 44 to be described later.

Further, the communication interface 44 is a communication device for performing communications with the server 100 (refer to FIG. 4A) installed in the casino or the like via a communication line. According to the present embodiment, in the slot machine 1, the communication interface 44 is used when the lottery result in the base winning combination lottery process, bet information in main game process (S2) to be described later, and the like are transferred between the slot machine and the server 100.

A body PCB 60 and a door PCB 80 to be described later are individually connected to the mother board 40 via a USB. Further, a power supply unit 45 is connected to the mother board 40. When power is supplied from the power supply unit 45 to the mother board 40, the main CPU 41 of the mother board 40 is activated. Then, the power is supplied to the gaming board 50 via the PCI bus, and the CPU 51 is activated.

Instruments and devices which generate input signals for the main CPU 41, and instruments and devices in which operations thereof are controlled by control signals transmitted from the main CPU 41 are connected to the body PCB 60 and the door PCB 80. The main CPU 41 executes the game program and the like stored in the RAM 43 based on the input signals input into the main CPU 41. Then, the main CPU 41 executes a predetermined arithmetic process such that a calculation result is stored in the RAM 43 and each of the instruments and devices is controlled in the control process.

The lamp 35, a sub-CPU 61, a hopper 66, a coin detector 67, a graphic board 68, the speaker 28, the touch panel 11, the bill validator 22, the ticket printer 30, the card reader 31, a key switch 33S, and the data indicator 32 are connected to the body PCB 60.

The sub-CPU 61 controls the rotation and stop operation of the reels 5L, 5C, and 5R. A motor drive circuit 62 provided with an FPGA 63 (Field Programmable Gate Array) and a driver 64 is connected to the sub-CPU 61. The FPGA 63 is an electronic circuit such as a programmable LSI circuit, and functions as the control circuit of stepping motors 70L, 70C, and 70R. The driver 64 works as an amplifier circuit which amplifies pulses to be input into the stepping motors 70L, 70C, and 70R. The 1-2 phase excitation type of stepping motors 70L, 70C, and 70R for rotating the respective reels 5L, 5C, and 5R are connected to the motor drive circuit 62.

An index detection circuit 65 and a position change detection circuit 71 are connected to the sub-CPU 61. The index detection circuit 65 detects the positions (for example, reference points) of the reels 5L, 5C, and 5R during rotation, and detects the loss of synchronism of the reels 5L, 5C, and 5R.

The position change detection circuit 71 detects changes in positions of the stopped reels 5L, 5C, and 5R after the rotation of the reels 5L, 5C, and 5R is stopped. For example, the position change detection circuit 71 detects the changes in the rotational positions of the respective stopped reels 5L, 5C, and 5R when the game player forcibly changes the rotational positions of the reels to obtain a combination of symbols corresponding to one of the winning combinations although the combination of symbols is not supposed to serve as the winning mode in fact.

The hopper 66 is installed in the cabinet 2 and pays out a prescribed number of coins from the coin payout opening 23 to the coin tray 24 based on a control signal transmitted from the main CPU 41. The coin detector 67 is arranged in the inside of the coin payout opening 23, and outputs an input signal to the main CPU 41 when the payout of the prescribed number of coins from the coin payout opening 23 is detected.

The graphic board 68 controls image displays on the upper image display panel 27 and the lower image display panel 6 based on control signals transmitted from the main CPU 41. For example, the credit number stored in the RAM 43 and owned by the game player is displayed on the credit number display part 8. Then, the number of credits to be paid out displayed on the payout number display part 9. When the double-up game process (S16) is performed, control is conducted so as to display relevant images (refer to FIGS. 11 to 13) on a double-up game screen.

Here, the graphic board 68 is provided with a VDP (Video Display Processor) which generates image data based on a control signal transmitted from the main CPU 41, a video RAM which temporarily stores the image data generated by the VDP, and the like. And image data used when the VDP generates the image data is included in the game program.

The bill validator 22 checks the suitability of bills and tickets 25 with the bar codes, and accepts authentic bills and authentic tickets 25 with the bar code into the cabinet 2. The bill validator 22 outputs an input signal to the main CPU 41 based on the amount of the bills when the authentic bills are accepted. Further, the bill validator 22 outputs an input signal to the main CPU 41 based on the number of coins recorded on the authentic tickets 25 with the bar codes.

Based on a control signal output from the main CPU 41, the ticket printer 30 prints, on a ticket, a bar code in which data such as the credit number stored in the RAM 43 is encoded, and outputs the ticket as a ticket with a bar code 25. And in the payout process (S20) to be described later, when an amount after tax is paid out, the ticket printer 30 outputs a receipt.

The card reader 31 reads data from the smart card, transmits the read data to the main CPU 41, or writes data in the smart card based on the control signal transmitted from the main CPU 41. The key switch 33S is provided in the keypad 33 and outputs a predetermined input signal to the main CPU 41 based on the operation of the keypad 33. The data indicator 32 displays the data read by the card reader 31 and data input from the keypad 33 based on the control signal transmitted from the main CPU 41.

On the other hand, the control panel 20, the reverter 21S, the coin counter 21C, and a CRT (cold cathode tube) 81 are connected to the door PCB 80. A spin switch 13S corresponding to the spin button 13, a change switch 14S corresponding to the change button 14, a CASHOUT switch 15S corresponding to the CASHOUT button 15, a 1-BET switch 16S corresponding to the 1-BET button 16, and a MAX BET switch 17S corresponding to the MAX BET button 17 are provided in the control panel 20. Each switch outputs an input signal to the main CPU 41 when a corresponding button is operated by the game player.

The coin counter 21C is provided in the inside of the coin receiving opening 21 and checks the suitability of coins inserted into the coin receiving opening 21 by the game player. Objects other than the authentic coins are discharged from the coin payout opening 23, and an input signal is output to the main CPU 41 when the authentic coin is detected.

The reverter 21S distributes coins validated as authentic coins by the coin counter 21C to a cashbox (not illustrated) or the hopper 66 in the slot machine 1. The cold cathode tube 81 is installed in the rear side of the lower image display panel 6 and the upper image display panel 27, is lit based on the control signal transmitted from the main CPU 41, and functions as a backlight.

Then, the slot machine 1 having the above-mentioned configuration is connected to the server 100 arranged in the casino or the like via the communication interface 44. That is, the plurality of slot machines 1 and the server 100 form one gaming system 105.

Here, the gaming system 105 and the server 100 forming the gaming system 105 are described in detail with reference to the drawings. FIG. 4A is an explanatory diagram schematically showing the gaming system 105.

As shown in FIG. 4A, the gaming system 105 according to the present embodiment comprises: the plurality of slot machines 1 (for example, five sets) and the server 100 which manages the accumulated JACKPOT amounts of the slot machines 1. Then, each of the slot machines 1 having the above-mentioned configuration is connected to the server 100 via the communication interface 44 in a manner enabling a two-way communication.

On the other hand, the server 100 forming the gaming system 105 comprises: a server CPU 101, a server ROM 102, a server RAM 103, and a server communication device 104.

The server CPU 101 is a processing unit for executing various kinds of control programs stored in the server ROM 102 to perform predetermined arithmetic processing based on the programs. The server ROM 102 also stores a server control process program to be described later. Therefore, the server CPU 101 performs control relating to a lottery and a payout to which an accumulated JACKPOT amount is applied, by executing the server control processing program stored in the server ROM 102.

The server RAM 103 is a storage device for temporarily storing the result of an arithmetic operation when the program is executed by the server CPU 101. The accumulated JACKPOT amount storage area 103A is formed in the server RAM 103.

When bet information is received from the slot machine 1 forming the gaming system 105, one to five percent (1-5%) of the amount indicated by the bet information is cumulatively added to each accumulated JACKPOT amount storage area 103A, and the accumulated amount is stored as the accumulated JACKPOT amount.

As mentioned above, in the present embodiment, each accumulated JACKPOT amount is paid out corresponding to each of five combinations, that is, combination of "JACKPOT 7", combination of "BLUE7", combination of "BELL", combination of "APPLE", and combination of "CHERRY". Therefore, storage areas corresponding to the five combinations are formed in the accumulated JACKPOT amount storage area 103A.

Here, the additional amount added to the accumulated JACKPOT amount storage area 103A is an amount for a specified percentage of the amount indicated by the bet information (for example, 1% to 5%), which is accumulated as both standard accumulated payout amount and special payout amount.

Here, the upper limit of the total amount to which the additional amount is cumulatively added is not defined for the standard accumulated payout amount and the additional amount is cumulatively added to the accumulated JACKPOT amount without any limits thereto until the accumulated JACKPOT amount is paid out.

On the other hand, although the additional amount is also cumulatively added to the special payout amount as well as the standard accumulated payout amount, a tax free limited amount (for example, 1199 dollars), which is less than the lowest limited amount for tax liability (for example, 1200 dollars), is defined as the upper limit of the special payout amount.

Therefore, the additional amount is cumulatively added to the accumulated JACKPOT amount storage area 103A every time when the additional amount is generated, and as far as the standard accumulated payout amount is less than 1200 dollars, the values of the standard accumulated payout amount and the special payout amount are the same. On the other hand, once the standard accumulated payout amount reaches 1200 dollars or more, the standard accumulated payout amount and the special payout amount are different.

Thus, when the additional amount is cumulatively added to each accumulated JACKPOT amount storage area 103A, the accumulated JACKPOT amount (the standard accumulated payout amount or the special payout amount) stored in the accumulated JACKPOT amount storage area 103A corresponding to a winning combination is paid as an award to the game player who achieves a predetermined condition such as winning one of the winning combinations of "JACKPOT 7", "BLUE 7", "BELL", "APPLE", and "CHERRY" (hereinafter referred to as the five winning combinations such as the "JACKPOT 7" combination).

Here, the "accumulated JACKPOT amount" is referred to as a general name standing for both the standard accumulated payout amount and the special payout stored amount in the accumulated JACKPOT amount storage area 103A.

And, the server communication device 104 is a communication device connected to the communication interface 44 of the slot machine 1 forming the gaming system 105 in the manner enabling the two-way communication. That is, the server communication device 104 is used when the bet information, the lottery result, and the like transmitted from the slot machine 1 are received, or when a JACKPOT winning signal (including the face values of the standard accumulated payout amount and the special payout amount) is transmitted to the relevant slot machine 1 when the accumulated JACKPOT amount is paid out.

Figure 5:
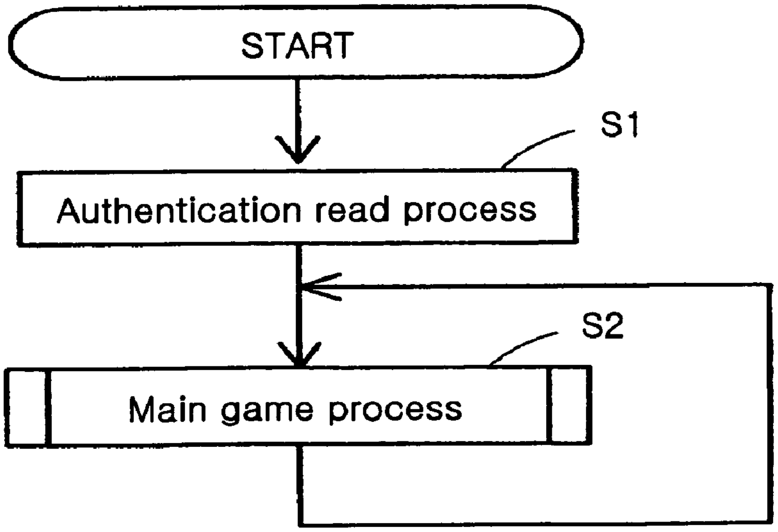
FIG. 5 shows a flowchart of a main control program in the slot machine according to the present embodiment.

Next, the main control program executed in the slot machine 1 according to the present embodiment is described in detail with reference to the drawings. FIG. 5 shows a flowchart of the main control program.

It is assumed that the memory card 53 is already inserted in the card slot 53S in the slot machine 1 and that the GAL 54 is already attached to the IC socket 54S.

First, when an electric power switch is turned on in the power supply unit 45 (application of power), the mother board 40 and the gaming board 50 are individually activated, and authentication read process (S1) is executed. In this authentication read process (S1), the mother board 40 and the gaming board 50 execute individually separate processes in parallel.

Specifically, in the gaming board 50, the CPU 51 reads the preliminary authentication program stored in the boot ROM 52 to perform a preliminary authentication for confirming and proving in advance that the authentication program is not altered before being loaded into the mother board 40 in accordance with the read preliminary authentication program.

On the other hand, in the mother board 40, the main CPU 41 executes the BIOS stored in the ROM 42 to decompress compressed data built into the BIOS onto the RAM 43, and executes the BIOS decompressed onto the RAM 43 to perform the diagnosis and initialization of various peripheral devices.

Then, the main CPU 41 reads the authentication program stored in the ROM 55 to execute authentication process for verifying and authenticating that the game program and the like stored in the memory card 53 inserted in the card slot 53S is not altered. After this authentication process is completed normally, the main CPU 41 writes the authenticated game program and the like in the RAM 43, and acquires the payout rate setting data and the country identification information.

After the above process, the main CPU 41 terminates the authentication read process (S1).

Next, in S2, the main CPU 41 reads sequentially the game program and the like authenticated in the authentication read process (S1) from the RAM 43 to execute the read program, and then executes the main game process. By executing this main game process (S2), the game in the slot machine 1 according to the present embodiment is performed. Then, the main game process (S2) is repeatedly executed as far as the power is supplied to the slot machine 1.

Figure 6:
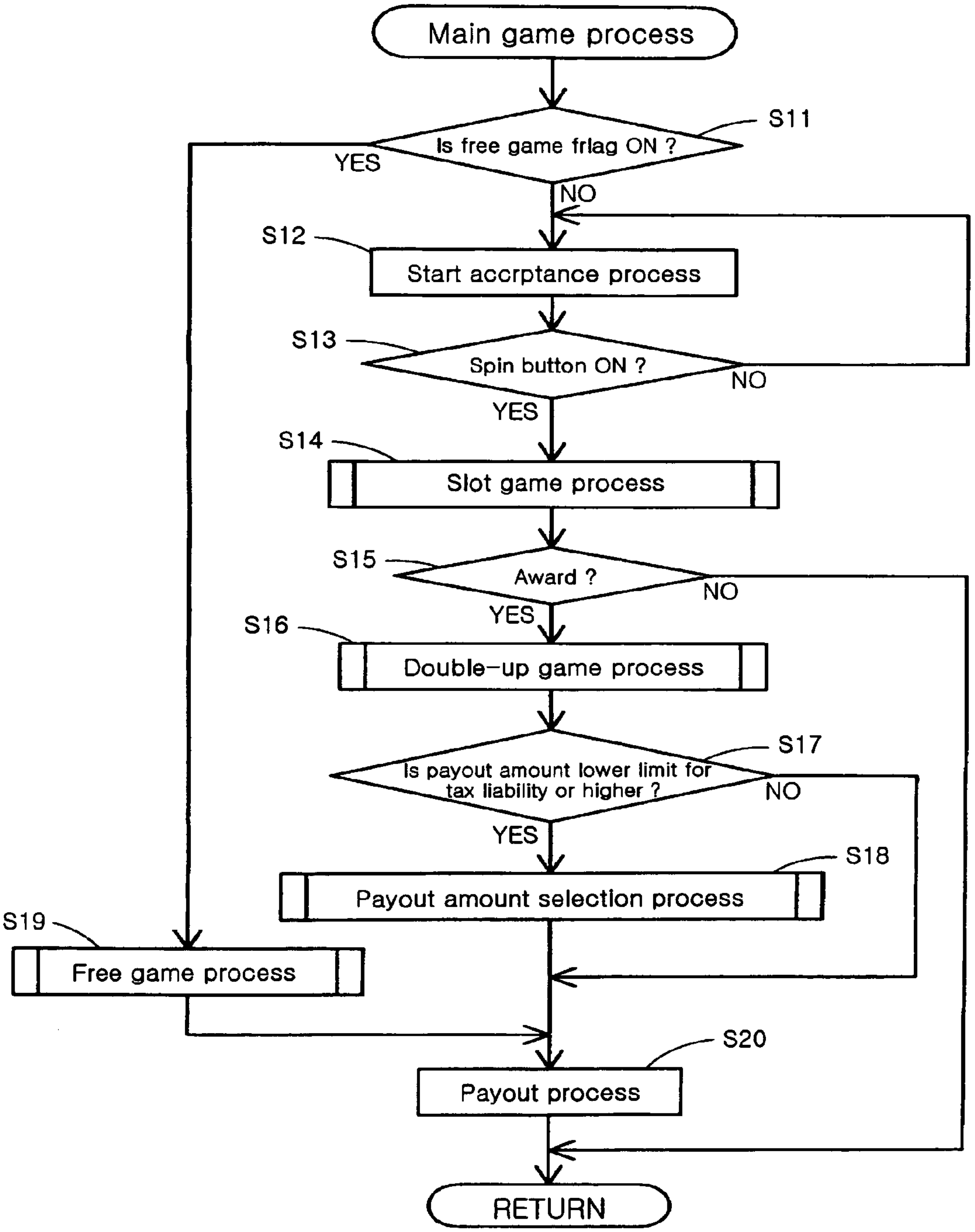
FIG. 6 shows a flowchart of a main game process program in the slot machine according to the present embodiment.

Next, the main game process program executed in the main game process (S2) is described based on FIG. 6. FIG. 6 shows a flowchart of the main game process program in the slot machine according to the present embodiment. Each program shown in the flowcharts of the following FIGS. 7, 10, 14, and 16 is stored in the ROM 42 and the RAM 43 provided in the slot machine 1, and executed by the main CPU 41.

When the main game process (S2) is started, the main CPU 41 performs a predetermined initial setting, and then determines whether or not a free game flag is stored in the RAM 43 (S11). This free game flag indicates that a free game can be played without consuming credits when the free game flag is stored in the RAM 43. When the free game flag is stored in the RAM 43 (S11: YES), the main CPU 41 shifts to free game process (S19) to execute the free game process (S19). Since this free game process (S19) will be described later in detail with reference to the drawings, the description thereof is omitted here. The main CPU 41 shifts the processing to payout process (S20) after completion of the free game process (S19).

On the other hand, when the free game flag is not stored in the RAM 43 (S11: NO), the main CPU 41 shifts the processing to S12.

In S12, the main CPU 41 executes a start acceptance process for setting the insertion of coins, a bet number for the pay line L, and the like. At this time, in the start acceptance processing (S12), the insertion of coins and a bet operation using the 1-BET button 16 and the MAX BET button 17 are performed by the game player.

Then, in S13, the main CPU 41 determines whether or not the spin button 13 is pressed. The determination whether or not the spin button 13 is pressed is made based on whether or not an input signal is received from the spin switch 13S.

When the spin button 13 is not pressed (S13: NO), the main CPU 41 returns to the start acceptance process (S12) again. An operation for correcting the bet number and the like is enabled at this time. On the other hand, when the spin button 13 is pressed (S13: YES), a bet number set to the pay line L based on the operations of the 1-BET button 16 and the MAX BET button 17 is subtracted from the credit number owned by the game player, and the resultant information is stored in the RAM 43 as bet information.

Subsequently, in S14, the main CPU 41 executes a slot game process for performing a game in the slot machine 1 by using the bet number determined in the start acceptance process (S12).

Figure 7:
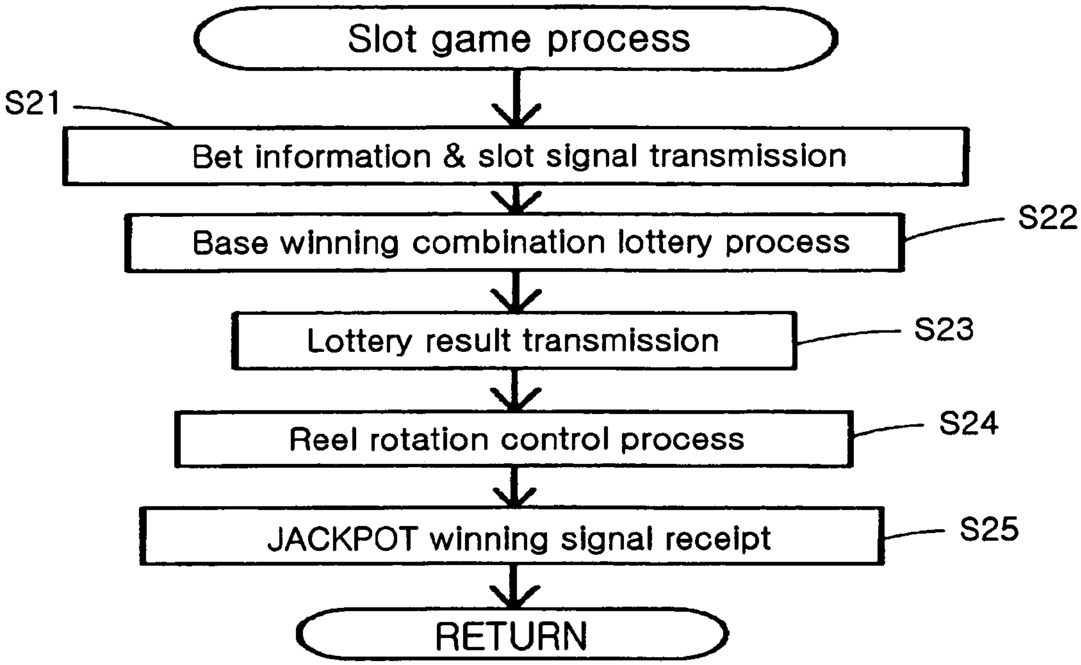
FIG. 7 shows a flowchart of a slot game process program in the slot machine according to the present embodiment.

Here, a slot game process program executed in the slot game process (S14) is described in detail with reference to the drawings. FIG. 7 shows a flowchart of the slot game process program.

As shown in FIG. 7, when the program shifts to the slot game process (S14), the main CPU 41 first reads the bet information from the RAM 43 to transmit the bet information and a slot game start signal indicating that the game in the slot machine 1 is started to the server 100 via the communication interface 44 (S21). Here, the bet information transmitted from the slot machine 1 is used by the server 100 when calculating the accumulated JACKPOT amount (the standard accumulated payout amount and the special payout amount). Then, the slot start signal is used when a JACKPOT lottery process (S104) in the server 100 is executed. With respect to this point, a detailed explanation will be made later.

After transmitting the bet information and the slot start signal to the server 100, the main CPU 41 shifts the processing to S22.

In S22, the main CPU 41 executes a base winning combination lottery process. Specifically, the main CPU 41 selects a random number value corresponding to each of the three reels 5L, 5C, and 5R from a numeric value range of 0 to 255 by executing a random number generation program included in the lottery program stored in the RAM 43. Then, the main CPU 41 refers to the symbol weighting data corresponding to the payout rate setting data, and determines the code numbers of the respective reels 5L, 5C, and 5R (refer to FIG. 2) based on the selected three random number values. After storing the determined code numbers of the respective reels 5L, 5C, and 5R in the RAM 43, the main CPU 41 shifts to S23.

Here, since the code number of each of the reels 5L, 5C, and 5R corresponds to the code number of a symbol stopped and displayed statically along the pay line L, a winning combination in the game is determined when the main CPU 41 determines the code number of each of the reels 5L, 5C, and 5R. For example, when the code numbers of the reels 5L, 5C, and 5R are determined respectively as “00”, “00”, and “00”, the main CPU 41 determines the winning combination to be “JACKPOT 7”. Thus, a lottery of the base winning combination (refer to FIG. 8) is held by determining the code numbers of the respective reels 5L, 5C, and 5R.

In the present embodiment, an example is described in which one winning combination is determined from among a plurality of kinds of base winning combinations by determining a combination of symbols to be stopped and displayed statically. However, in the present invention, for example, one winning combination to be chosen from among the plurality of kinds of base winning combinations may be determined first by lottery, and then the combination of symbols to be stopped and displayed statically may be determined based on the above winning combination.

Here, the base winning combination and a payout thereof are described with reference to FIG. 8 in the case of playing the game using the reels 5L, 5C, and 5R on the slot machine 1. FIG. 8 is a table showing winning combinations and winning probabilities thereof, and payout thereof in the case of playing the game using the reels 5L, 5C, and 5R.

Here, a “base payout amount” shown in FIG. 8 means the amount of payout for one bet, and a “standard payout amount” means the amount of payout calculated by multiplying the base payout amount by the bet number. Therefore, when the bet number is “1”, the “base payout amount” is equal to the “standard payout amount”, and the payout amount shown in FIG. 8 is paid out. Then, when the bet number is equal to or more than “2”, an amount obtained by multiplying the “base payout amount” shown in FIG. 8 by the bet number is the “standard payout amount”.

The probability of winning each winning combination indicated in FIG. 8 shows a case where the payout rate is 88%. In addition, the probabilities of winning shown in the table indicates probabilities of winning respective winning combinations when each code number of each reel 5L, 5C, and 5R is determined based on the three random numbers in reference to the weighting data of symbols. That is, the random number value is not associated directly with each winning combination.

For example, as shown in FIG. 8, the probability of winning the winning combination of “JACKPOT 7” is 0.5%. When the winning combination of “JACKPOT 7” is won, three symbols of “JACKPOT 7” are stopped and displayed statically along the pay line, and the accumulated JACKPOT amount (the standard accumulated payout amount or the special payout amount) accumulated in the storage area of “JACKPOT 7” which is formed in the accumulated JACKPOT amount storage area 103A of the server 100 is paid out as an award.

When the accumulated JACKPOT amount (the standard accumulated payout amount or the special payout amount) is provided as the award, the standard accumulated payout amount of the accumulated JACKPOT amount concerned is handled as the "standard payout amount".

Here, the calculation of the standard payout amount corresponding to the base winning combination is specifically described using a case where the base winning combination of "PLUM" is won as an illustrative example. As shown in FIG. 8, the probability of winning "PLUM" is 1.8%. When this winning combination is realized, three symbols of "PLUM" are stopped and displayed statically along the pay line L, and the standard payout amount calculated by multiplying four (4) credits as the base payout amount by a bet number having been bet at the time of starting the game.

The probability of winning and the base payout amount are set for each winning combination shown in FIG. 8 in the same manner. However, if a combination of symbols corresponding to none of the winning combinations shown in FIG. 8 is stopped and displayed statically, the stopped combination is a blank (or losing combination) and the standard payout amount based on the base winning combination is not provided.

Then, as shown in FIG. 8, in addition to the "base payout amount" used as the basis of calculation of the "standard payout amount", the "special payout amount" which can be selected as an award when a prescribed condition is satisfied is defined for each base winning combination. This "special payout amount" is used in payout amount selection process (S18) to be described later, and it becomes possible to select either the payout amount related to the "standard payout amount" or the "special payout amount". This "amount of special payout" will be described later in detail in the payout amount selection process (S18).

Referring back to FIG. 7, the slot game process (S14) is described. When the base winning combination lottery process (S22) is terminated and the processing is shifted to S23, the main CPU 41 transmits lottery result data indicating the lottery result of the base winning combination lottery process (S22) to the server 100 via the communication interface 44. This lottery result data is used in the server control process program to be described later. This point will be described later in detail.

After transmitting the lottery result data to the server 100, the main CPU 41 shifts the processing to S24.

Subsequently, in S24, the main CPU 41 executes a reel rotation control process. The reel rotation control process is processing of stopping the rotation of the reels 5L, 5C, and 5R such that the combination of symbols determined in the base winning combination lottery process (S22) is stopped and displayed statically along the pay line L after starting the rotation of all the reels 5L, 5C, and 5R. This processing is executed between the main CPU 41 and the sub-CPU 61.

Specifically, in the reel rotation control process (S24) the main CPU 41 transmits first a start signal indicating that the rotation of the reels is to be started, to the sub-CPU 61. Upon receiving the start signal, the sub-CPU 61 drives the stepping motors 70L, 70C, and 70R by using the motor drive circuit 62 and the driver 64 to start the rotation of the reels 5L, 5C, and 5R.

Then, after the transmission of the start signal, the main CPU 41 determines an effect mode (a mode in which an image is displayed on the lower image display panel 6 and the sound output from the speaker 28) for one game, and starts thus-determined effect mode with a determined effect pattern.

Then, when a prescribed stop timing to stop the rotation of the reels 5L, 5C, and 5R arrives, the main CPU 41 transmits the code numbers of the reels stored in the RAM 43 to the sub-CPU 61. The sub-CPU 61 executes a reel stop process based on the code numbers of the reels. Thereby, the symbols corresponding to the lottery result are stopped and displayed statically along the pay line L in the respective display windows 10L, 10C, and 10R.

Then, in S25, the main CPU 41 receives the JACKPOT winning signal transmitted from the server 100 via the communication interface 44.

When any one of the five winning combinations such as the combination of "JACKPOT 7" is won in the base winning combination lottery process (S22), or when winning is obtained in JACKPOT lottery process (S104) to be described later, this JACKPOT winning signal is transmitted to the winning slot machine 1. Therefore, the slot machine 1 corresponding to either of the above two conditions receives the JACKPOT winning signal for providing the game player, as an award, the accumulated JACKPOT amount (the standard accumulated payout amount or the special payout amount) at the time of winning which is stored in a storage area of the accumulated JACKPOT amount storage area 103A corresponding to the relevant condition.

After receiving the JACKPOT winning signal, and storing the accumulated JACKPOT amount (the standard accumulated payout amount and the special payout amount) included in the JACKPOT winning signal in the RAM 43 as the payout amount, the main CPU 41 terminates the slot game process (S14).

Slot machines 1 corresponding to neither of the two conditions do not receive the JACKPOT winning signal, and the slot game process (S14) is terminated in that condition.

Returning to FIG. 6 again, the main game process (S2) is described. Terminating the slot game process (S14), and shifting to S15, the main CPU 41 determines whether or not there is the payment of payout in the relevant slot machine 1. Therefore, when the JACKPOT winning signal is received, or when the base winning combination is won (S15: YES), the main CPU 41 shifts the processing to S16. On the other hand, when the JACKPOT winning signal is not received and the base winning combination is not realized (S15: NO), the main game process (S2) is terminated in that condition.

Shifting to S16, the main CPU 41 executes the double-up game process. In the double-up game according to the present embodiment, an alternative type of game is played using the total amount of payout to be paid out to the game player. Specifically, the double-up game of guessing the color of the mark of a card is played. That is, the game player selects "BLACK" or "RED" to guess whether the mark of a card image 90 displayed on the lower image display panel 6 is red (diamond or heart) or black (spade or club). The game is configured such that the amount of payout is doubled when the selection of the game player coincides with the color of the mark of the card image, but the amount of payout becomes 0 in the case of discordance.

Therefore, an opportunity to obtain a high amount of payout is provided to the game player by executing the double-up game process (S16). For example, even when an base winning combination of a low standard payout amount is won, a case of winning the high payout amount may arise by executing the double-up game.

Since this double-up game process (S16) will be described later in detail with reference to the drawings, the description thereof is omitted here.

In S17, the main CPU 41 determines whether or not the standard payout amount stored in the RAM 43 (the standard payout amount related to the base winning combination and the standard payout amount related to JACKPOT winning (that is, the standard accumulated payout amount) is equal to or more than an amount for tax liability (hereinafter referred to as the minimum amount for tax liability) for a payout amount when the amount of payout is paid.

Specifically, in the present embodiment, a tax rate of 30% is applied to the payout amount when the payout amount is 1200 dollars or more. Accordingly, the minimum amount (lower limit) for tax liability is "1200 dollars".

Therefore, it is determined in S17 whether or not the payout amount is 1200 dollars or more. When the payout amount stored in the RAM 43 is 1200 dollars or more (S17: YES), the main CPU 41 shifts to S18 to execute the payout amount selection process. On the other hand, when the amount of payout is less than 1200 dollars (S17: NO), the main CPU 41 directly shifts to the payout process (S20).

In S18, the main CPU 41 executes the payout amount selection process of causing the game player to select any one of two kinds of payout amounts (the standard payout amount (the standard accumulated payout amount) and the special payout amount) Specifically, the two kinds of payout amounts are displayed on the lower image display panel 6, and the process of causing the game player to select either payout amount is executed by causing the game player to select one of the payout amounts by using the touch panel 11. Since this payout amount selection process (S18) will be described later in detail with reference to the drawings, the description thereof is omitted here.

When the game player selects one of the payout amounts through the payout amount selection process (S18), the main CPU 41 stores the selected amount in the RAM 43 as the payout amount, and shift the processing to S20.

In S20, the main CPU 41 fixes the amount of payout at the time of shifting to S20 as the amount to be paid, and executes the payout process of paying the amount to be paid. At this time, it is possible to pay the equivalent number of coins to the credit number (one credit corresponds to one coin) by the depression of the CASHOUT button 15, and also possible to pay out the award by the ticket 25 with the bar code.

In S17, when it is determined that the payout amount is less than 1200 dollars (the minimum amount for tax liability) (S17: NO) and the processing is shifted to the payout process (S20), the standard payout amount is directly paid to the game player as the payout amount.

On the other hand, when an amount after tax is paid in the payout process (S45), a receipt is printed by the ticket printer 30. Thus, when the receipt is brought to a prescribed place in the casino or the like, the attendant of the casino or the like can judge the presence or absence of tax payment in the game player, and tax payment procedures (for example, the signature of the game player and the like) for a plurality of times can be collectively made after completion of the game. As a result, a loss of amusement caused by the tax payment procedures can be prevented during game execution, and the game player can sufficiently enjoy the game.

Figure 9:
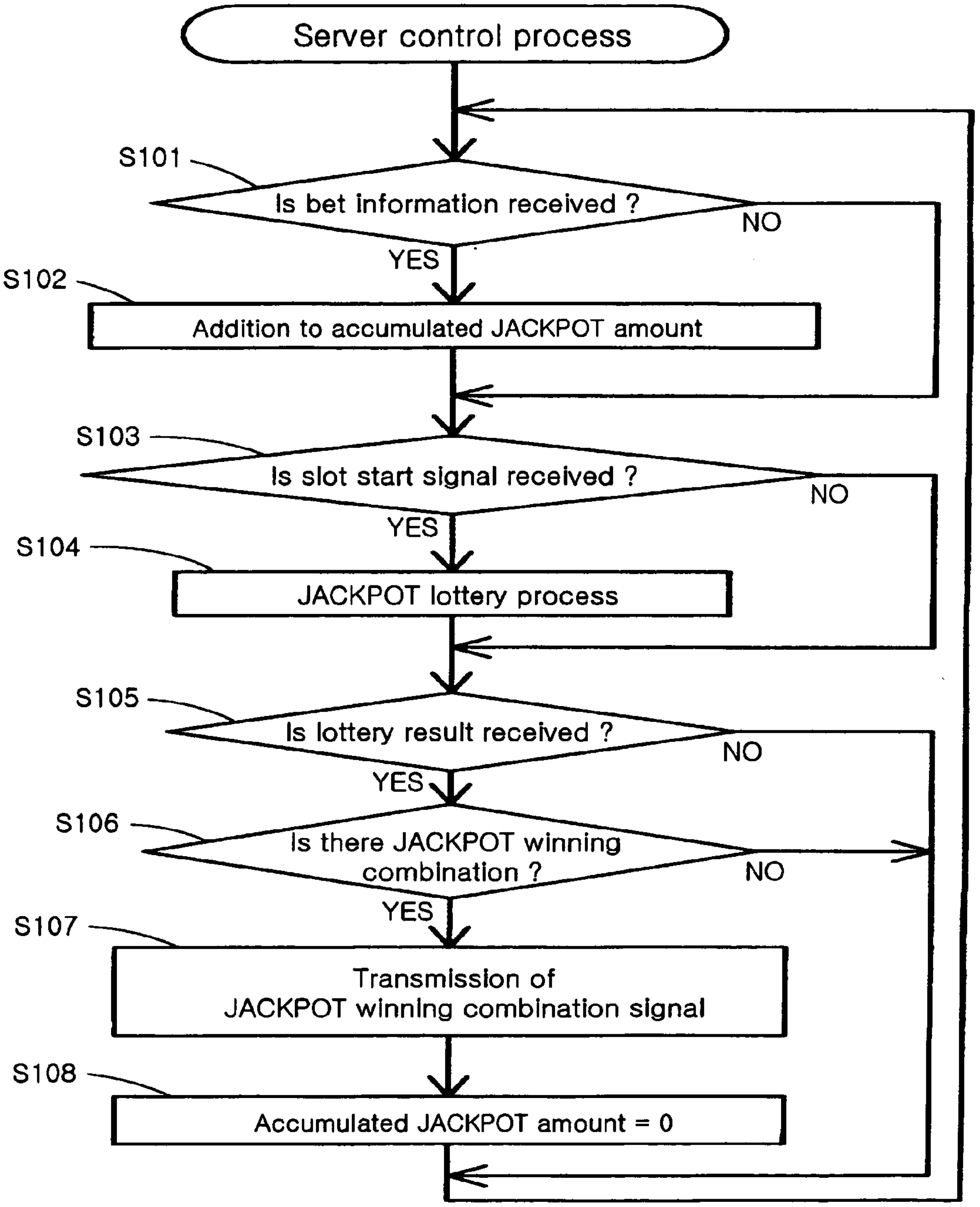
FIG. 9 shows a flowchart of a server control program in the server according to the present embodiment.

Next, the server control process program related to the server 100 forming the gaming system 105 according to the present embodiment is described in detail with reference to the drawings. FIG. 9 shows a flowchart of the server control process program.

As shown in FIG. 9, when the server control process program is started, the server CPU 101 determines whether or not the bet information is received from the slot machine 1 forming the gaming system 105 (S101).

As mentioned above, the slot machine 1 transmits the bet information in this game (S21) when the start acceptance process (S12) is finished and the spin button 13 is pressed. That is, the server CPU 101 determines in S101 whether or not the bet information transmitted from the slot machine 1 in S21 is received.

When the bet information is received (S101: YES), an amount for the specified proportion (for example, 1% to 5%) of an amount indicated by the received bet information is added (that is, the additional amount) to each accumulated amount of five storage areas formed in the accumulated JACKPOT amount storage area 103A (S102). At this time, the additional amount for each storage area of the accumulated JACKPOT amount storage area 103A is added to each of the standard accumulated payout amount and the special payout amount. After adding the additional amount for the specified proportion to the accumulated amount (the standard accumulated payout amount and the special payout amount) related to each storage area of the accumulated JACKPOT amount storage area 103A, the main CPU 41 shifts the processing to S103. On the other hand, when the bet information is not received (S101: NO), the processing shifts to S103 in that condition.

Subsequently, in S103, the server CPU 101 determines whether or not the slot start signal indicating the start of the game in the slot machine 1 is received. In this regard, in the slot machine 1 according to the present embodiment, the slot start signal is transmitted at the time of starting the game in both of the slot game process (S14) and the free game process (S19).

When the slot start signal is received (S103: YES), the server CPU 101 shifts the processing to the JACKPOT lottery process (S104). On the other hand, when the slot start signal is not received (S103: NO), the server CPU 101 shifts the processing to S105 in that condition.

In S104, the server CPU 101 executes the JACKPOT lottery process (S104) for determining by lottery whether or not the accumulated JACKPOT amount stored in the storage area related to "JACKPOT 7" is to be provided as the payout amount. The server CPU 101 selects one random number value from among a numeric value range of 0 to 511 by executing the random number generation program stored in the server ROM 102. Then, a lottery result in the JACKPOT lottery is determined based on a lottery table stored in the server ROM 102. After storing the lottery result of the JACKPOT lottery process (S104) in the RAM 43, the server CPU 101 shifts the processing to S105.

Specifically, in a case where "0" or "1" is selected as the random number value generated by the random number generation program, winning is achieved in the JACKPOT lottery process (S104), and the accumulated JACKPOT amount (the standard accumulated payout amount or the special payout amount) stored in the storage area related to "JACKPOT 7" is provided to the relevant slot machine 1 as the payout. On the other hand, in a case where the other random number value is selected, the lottery result is a blank (or losing combination) in the lottery of the JACKPOT lottery process (S104). The winning probability of this JACKPOT lottery process (S104) is approximately 0.4%.

As mentioned above, since the slot start signal is transmitted also in both of the slot game process (S14) and the free game process (S19) to execute the JACKPOT lottery process (S105), a case of giving the accumulated JACKPOT amount (the standard accumulated payout amount or the special payout amount) as the payout may arise in both of the slot game process (S14) and the free game process (S19). As a result, since an opportunity for a high amount of payout to be given increases, the slot machine 1 can attract a game player who expects the high amount of payout.

Then, in S105, the server CPU 101 determines whether or not the lottery result data indicating the lottery results of the base winning combination lottery process (S22 and S53) in the slot game process (S14) and the free game process (S19) of the slot machine 1 is received. When the lottery result data is not received (S105: NO), the server CPU 101 returns the processing to S101 in that condition. On the other hand, when the lottery result data is received (S105: YES), the server CPU 101 shifts the processing to S106.

In S106, the server CPU 101 determines the winning of JACKPOT for which the accumulated JACKPOT amount (the standard accumulated payout amount or the special payout amount) is provided as the payout. Here, there are two cases corresponding to the winning of JACKPOT, that is, a case of winning one of the five winning combinations such as the combination of "JACKPOT 7" in the base winning combination lottery process (S22 and S53) of the slot machine 1, and a case of winning the JACKPOT lottery process (S104) of the server 100.

When a case corresponds to either of the two cases and is the winning of JACKPOT (S106: YES), the server CPU 101 reads the accumulated JACKPOT amount (the standard accumulated payout amount and the special payout amount) from the storage area of the accumulated JACKPOT amount storage area 103A corresponding to the relevant condition, and transmits the JACKPOT winning signal indicating the face value of the accumulated JACKPOT amount (the standard accumulated payout amount and the special payout amount), and the winning of JACKPOT to the slot machine 1 winning the JACKPOT (S107).

Then, after transmitting the JACKPOT winning signal, the server CPU 101 resets the accumulated JACKPOT amount stored in the accumulated JACKPOT amount storage area 103A to "0" (S108). That is, all of the standard accumulated payout amount and the special payout amount related to all the storage areas of the accumulated JACKPOT amount storage area 103A are reset to "0". After resetting all the accumulated JACKPOT amounts (the standard accumulated payout amount and the special payout amount) of the accumulated JACKPOT amount storage area 103A, the server CPU 101 returns the processing to S101.

On the other hand, when the JACKPOT is not won (S106: NO), the server CPU 101 returns the processing to S101 in that condition.

Thus, in the gaming system 105 according to the present embodiment, whenever one game is played on the slot machine 1 forming the gaming system 105, the additional amount for the specified proportion of the bet number used on the slot machine 1 is accumulated in each storage area of the accumulated JACKPOT amount storage area 103A as the accumulated JACKPOT amount (the standard accumulated payout amount and the special payout amount), respectively, which is provided to the game player who wins the JACKPOT as the payout. That is, it is possible to cause the game player to have great expectations for participating in a high amount of payout. Since the high amount of payout can be obtained when winning is gained in one of the five winning combinations such as the combination of "JACKPOT 7" in the base winning combination lottery process (S22 and S53), and the JACKPOT lottery process (S104), it is possible to cause the game player to have greater expectations.

In this regard, each of the base winning combination lottery process (S22 and S53) and the JACKPOT lottery process (S104) is an independent lottery. Accordingly, even if the base winning combination lottery process (S22 and S53) is a blank, the high amount of payout can be received if the JACKPOT lottery process (S104) is won. Therefore, it is possible to provide a surprise and excitement of an unexpected high amount of payout to the game player. Further, the game player can receive the payout of the accumulated JACKPOT amount corresponding to the lottery result of the base winning combination lottery process (S22 and S53) and the JACKPOT lottery process (S104) in both of the slot game process (S14) and the free game process (S19). Therefore, the opportunity to acquire the high amount of payout increases, and great expectations can be provided to the game player who expects the high amount of payout.

In addition, the server control process program is configured to simultaneously reset the standard accumulated payout amount and the special payout amount in the accumulated JACKPOT amount storage area 103A after the transmission of the JACKPOT winning signal to the winning slot machine 1 (S108) when the JACKPOT is won (S106: YES). However, it is also possible to execute the reset according to the selected result of the payout amount selection process (S18) in the relevant slot machine 1. That is, it is also possible to configure the server control process program such that an amount of payout (for example, the standard accumulated payout amount) which is not selected in the payout amount selection process (S18) is reset when the server 100 receives a signal related to the selection, and a selected amount of payout (for example, the amount of special payout) is reset when the amount of payout is paid.

Figure 10:
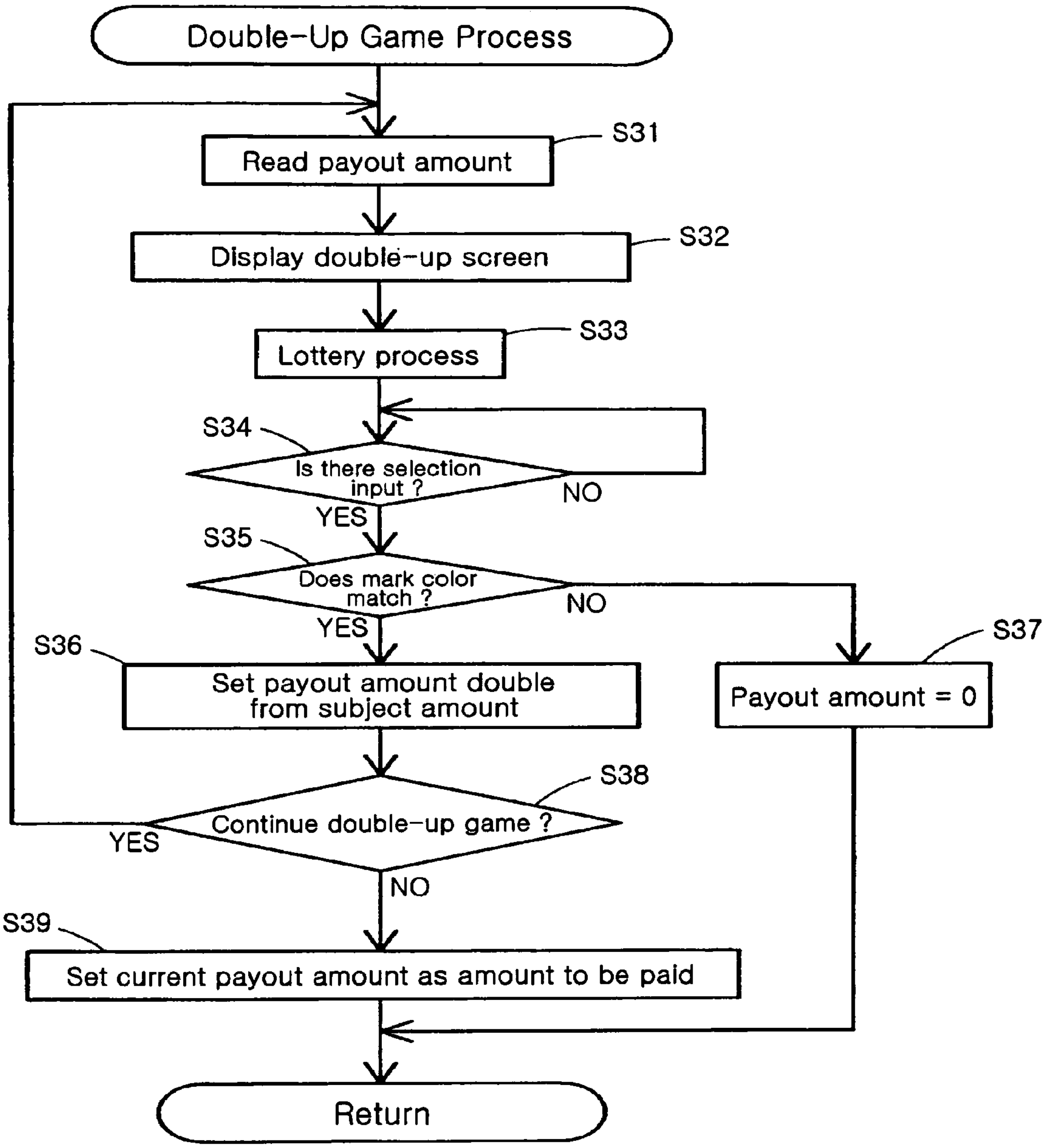
FIG. 10 shows a flowchart of a slot game process program in the slot machine according to the present embodiment.
Figure 12:
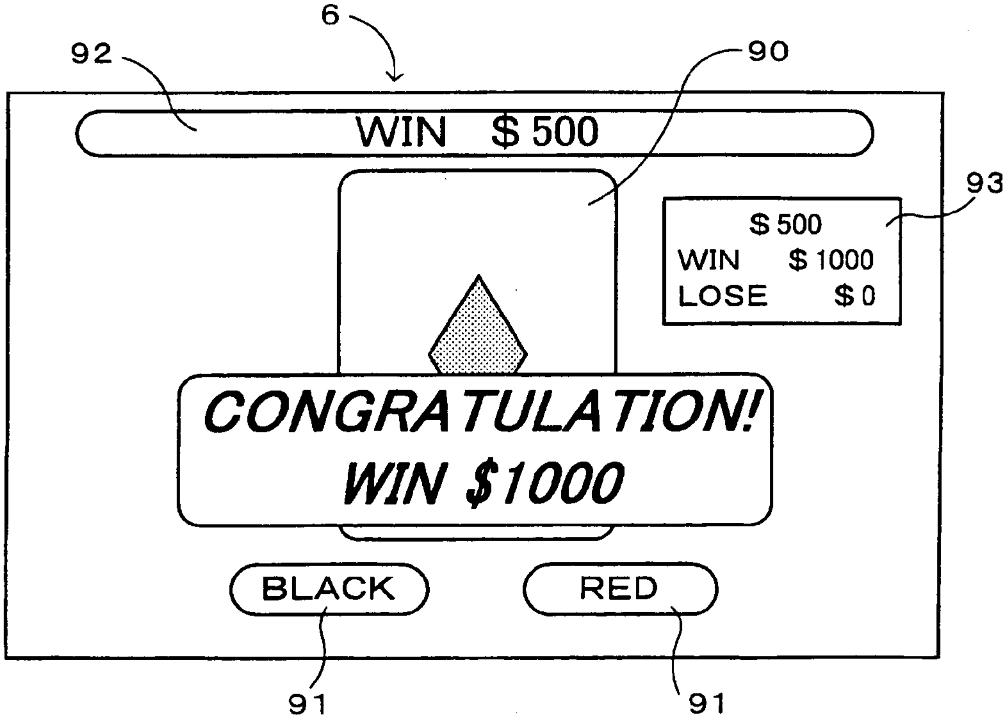
FIG. 12 shows an illustrative view (2) illustrating a display mode of the lower image display panel when a double-up game is executed.
Figure 13:
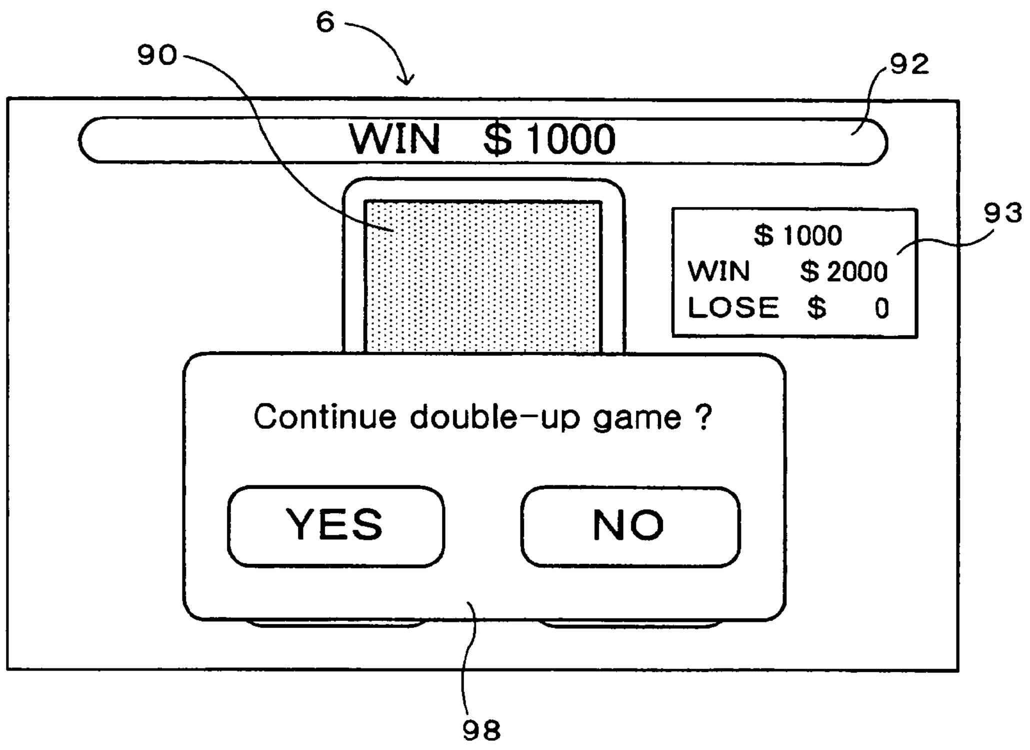
FIG. 13 shows an illustrative view (3) illustrating a display mode of the lower image display panel when a double-up game is executed.

Next, the double-up game process program executed in the double-up game process (S16) of the main game process program in the slot machine 1 is described in detail with reference to the drawings. FIG. 10 is a flowchart of the double-up game process program, and FIGS. 11 to 13 are explanatory diagrams of display modes of the lower image display panel 6 during double-up game process execution.

Shifting to the double-up game process (S16) in either the case where the JACKPOT winning signal is received or the case where the base winning combination is realized (S15: YES), the main CPU 41 reads the JACKPOT accumulated amount or the standard payout amount related to the winning combination indicated by the JACKPOT winning signal (S31). That is, in the case of the JACKPOT accumulated amount, the standard accumulated payout amount is read, and in the case of the base winning combination, the standard payout amount related to the winning combination is read.

Then, in S32, the main CPU 41 displays the double-up game screen on the lower image display panel 6. Here, a display mode of the lower image display panel 6 during the double-up game execution is described in detail with reference to FIG. 11.

Figure 11:
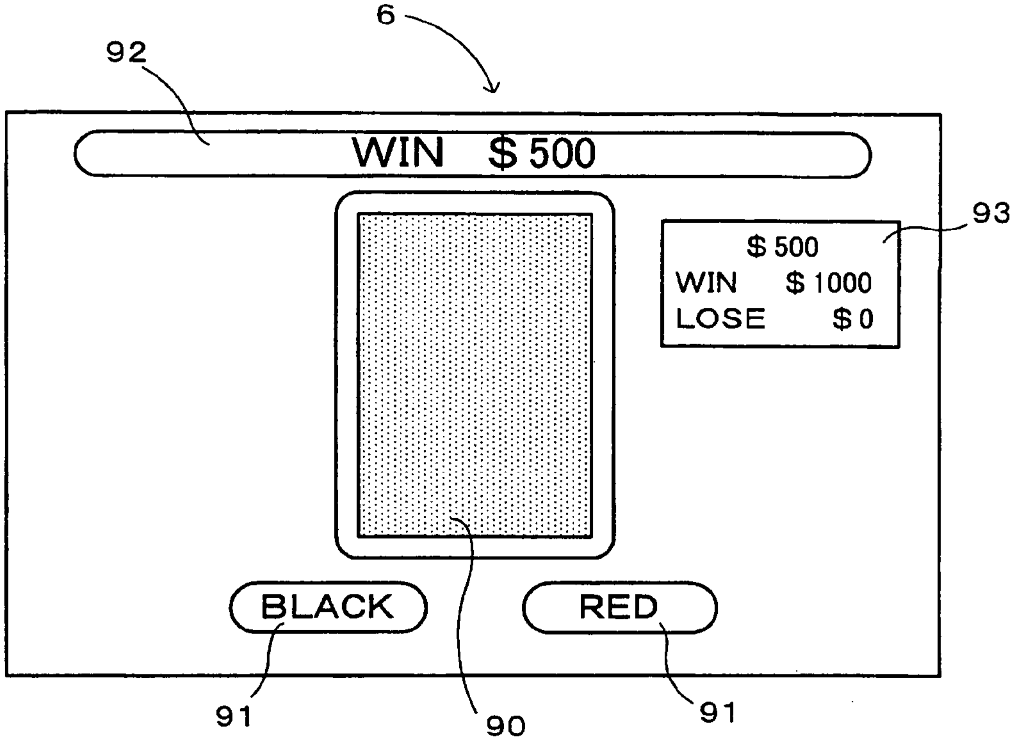
FIG. 11 shows an illustrative view (1) illustrating a display mode of the lower image display panel when a double-up game is executed.

As shown in FIG. 11, during the double-up game execution, the card image 90, selection display parts 91 showing two kinds of alternatives of "RED" and "BLACK", a payout amount display part 92 showing a current amount of payout, and a post-game payout display part 93 displaying a target amount of the double-up game, a winning amount of payout when guessing the mark color of the card is successful, and a losing amount of payout when guessing the mark color of the card is failed, are displayed on the lower image display panel 6.

For example, in a case shown in FIG. 11, a current amount of payout is 500 dollars, and 500 dollars is displayed on the payout amount display part 92. Then, 500 dollars as a target amount, 1000 dollars as a winning amount of payout, and 0 dollar as a losing amount of payout are displayed on the post-game payout display part 93. At the time of S32, the back face of the card image 90 is displayed from which the mark of the card cannot be visually recognized.

After displaying the double-up game screen as shown in FIG. 11 on the lower image display panel 6, the main CPU 41 shifts the processing to S33.

In S33, the main CPU 41 determines the mark of the obverse side of the card image 90 by lottery. In this lottery process (S33), predetermined random number value ranges are set to four kinds of marks of "spade", "diamond", "club", and "heart", respectively, in a random number value range of 0 to 255, and the mark to be displayed on the obverse side of the card image 90 is determined by determining one random number value by using the random number generation program.

After determining the mark to be displayed on the obverse side of the card image 90 and storing the lottery result in the RAM 43, the main CPU 41 shifts the processing to S34.

Shifting to S34, the main CPU 41 determines whether or not the game player selects either "RED" or "BLACK" by operating the selection display part 91 of either "RED" or "BLACK". Specifically, the main CPU 41 makes the determination based on whether or not a portion corresponding to the selection display part 91 of the touch panel 11 is pressed by the game player.

When the game player does not operate the selection display part 91 (S34: NO), the main CPU 41 holds the processing until the game player operates the selection display part 91. On the other hand, when the selection display part 91 is operated by the game player (S34: YES), the main CPU 41 stores a selected result based on the operated selection display part 91 in the RAM 43, and then shifts to S35.

In S35, the main CPU 41 displays the mark corresponding to the lottery result on the card image 90 to notify the lottery result to the game player, and reads the lottery result and the selected result from the RAM to determine whether or not the selected result of the game player coincides with the mark color of the lottery result. When the mark color of the selected result coincides with the lottery result (S35: YES), since the selection of the game player is right, the main CPU 41 performs display indicating that the amount of payout is doubled (refer to FIG. 12), and sets an amount obtained by doubling the current target amount as the amount of payout (S36). The main CPU 41 shifts the processing to S38 after S36.

On the other hand, when the mark color of the selected result of the game player does not coincide with the lottery result (S35: NO), the current payout amount is set to "0" (S37). That is, the main CPU 41 sets the payout amount to "0" and then terminates the double-up game processing (S16).

Subsequently, in S38, the main CPU 41 determines whether or not to continue the double-up game. Here, the main CPU 41 first displays, on the lower image display panel 6, a continuation selection display 98 asking whether or not to continue the double-up game (refer to FIG. 13).

As shown in FIG. 13, an alternative indicating the continuation or the termination of the double-up game is displayed on the continuation selection display 98, and an input signal is transmitted to the main CPU 41 when the game player operates the touch panel 11 of a desired alternative portion. The main CPU 41 determines a selected result related to the continuation of the double-up game based on the input signal from the touch panel 11. When the game player makes a selection of wishing the continuation of the double-up game (S38: YES), the processing is returned to S31. In this case, in the next double-up game, the double-up game is played in which a target amount is the amount of payout at this point of time (that is, the amount of payout doubled in S36). On the other hand, when the game player makes a selection of wishing the termination of the double-up game (S38: NO), the main CPU 41 stores the payout amount at the present time in the RAM 43 as the amount to be paid (S39), and terminates the double-up game processing (S16).

Figure 14:
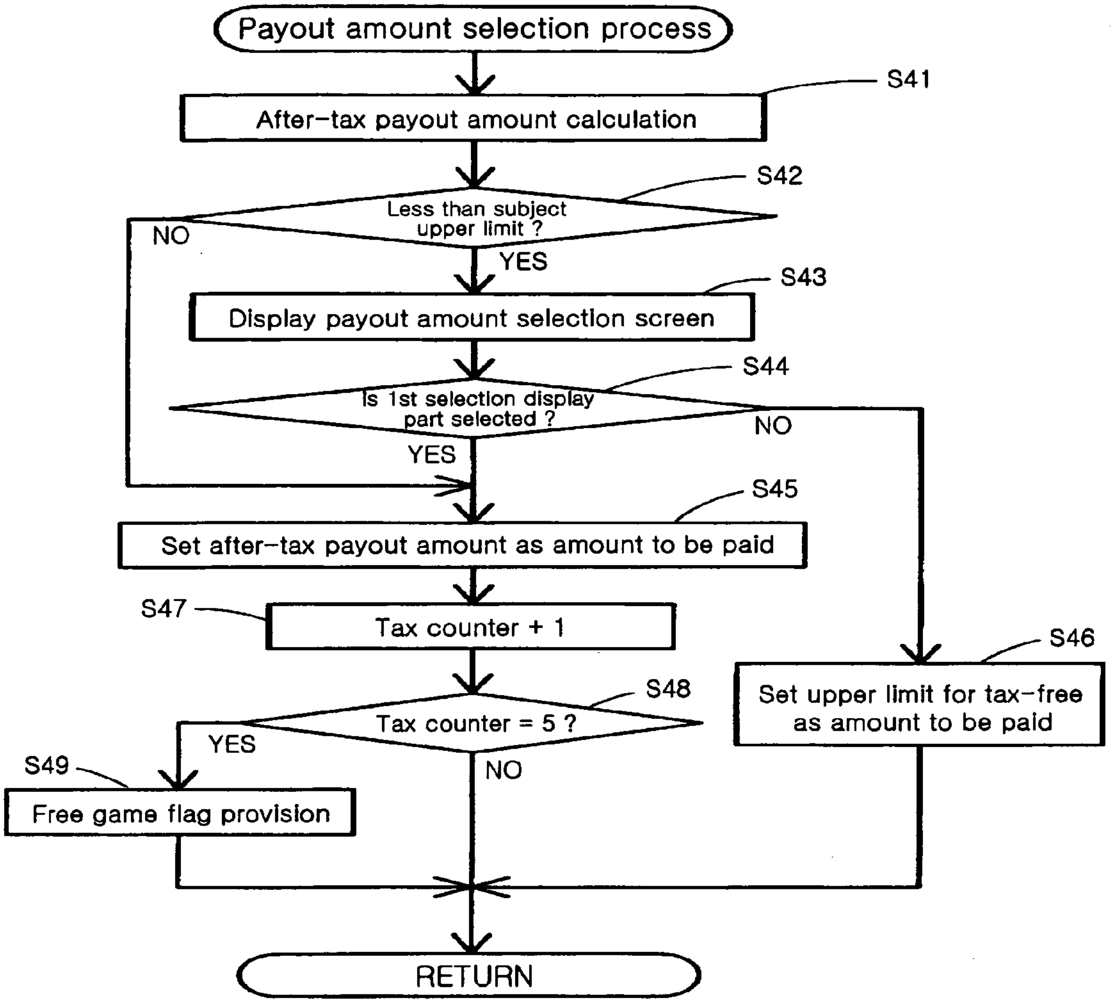
FIG. 14 shows a flowchart of a payout amount selection process program in the slot machine according to the present embodiment.
Figure 15:
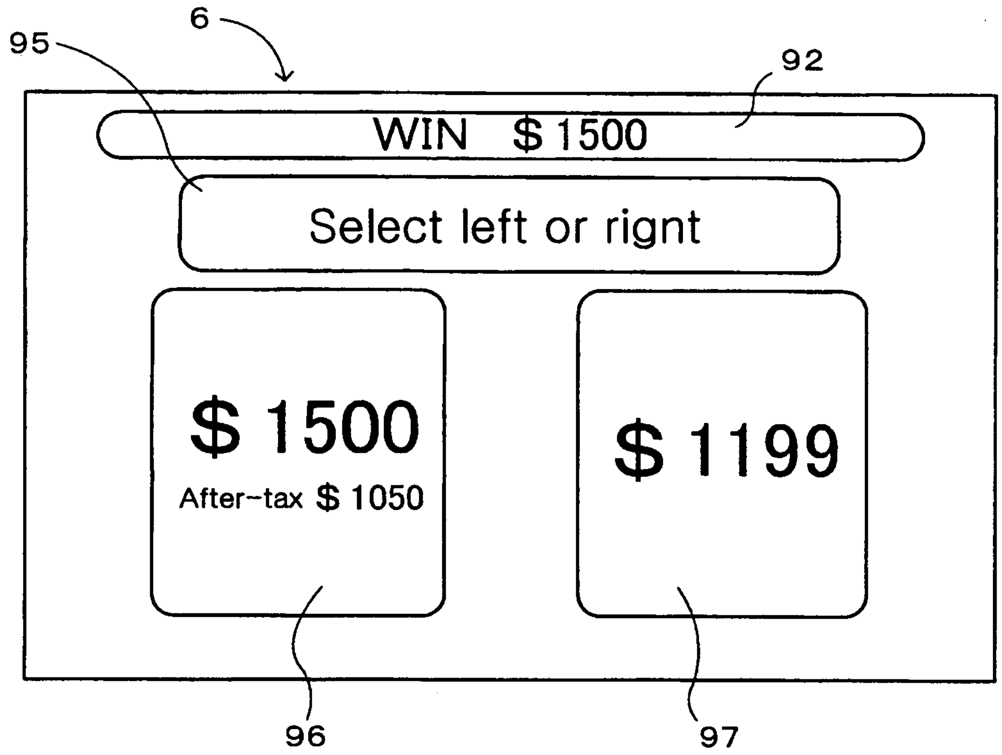
FIG. 15 shows an illustrative view (1) illustrating a display mode of the lower image display panel when a payout amount selection process is conducted.

Next, the payout amount selection process program executed in the payout amount selection process (S18) of the main game process (S2) in the slot machine 1 is described in detail with reference to the drawings. FIG. 14 shows a flowchart of the payout amount selection process program. FIG. 15 is an explanatory diagram of a display mode of the lower image display panel 6 in executing the payout amount selection process.

When the payout amount after termination of the double-up game process (S16) is equal to or more than the minimum amount for tax liability (1200 dollars) (S17: YES), the main CPU 41 shifts the processing to the payout amount selection process (S18), and starts to execute the payout amount selection process program.

When the payout amount selection process program is started, the main CPU 41 first calculates (S41) the amount after tax according to a predetermined tax rate (for example, 30%) (hereinafter referred to as the payout amount after tax) concerning the standard payout amount at the time of shifting to the payout amount selection process (S18).

For example, when the standard payout amount at the time of shifting to the payout amount selection process (S18) is "1500 dollars", 450 dollars (30% of 1500 dollars) are collected as a tax, and the payout amount after tax becomes 1050 dollars.

The main CPU 41 calculates the payout amount after tax based on the amount to be paid, stores the calculated amount after tax in the RAM 43, and then shifts the processing to S42.

In S42, the main CPU 41 determines whether or not the amount of payout based on the standard payout amount is equal to or less than the minimum amount for tax liability (hereinafter referred to as the target upper limit amount) even when a tax for the payout amount is deducted.

In the present embodiment, since the tax payment of 30% of the face value of the payout amount is obliged if the payout amount is 1200 dollars or more, the target upper limit amount is "1714 dollars" ("target upper limit amount"="minimum amount for tax liability"÷"100%−(tax rate)").

When the amount of payout is 1714 dollars or less (S42: YES), the main CPU 41 shifts the processing to S43. On the other hand, when the amount of payout is greater than 1714 dollars (S42: NO), the main CPU 41 shifts the processing to S45.

In S43 to which the processing is shifted when the payout amount based on the standard payout amount is equal to or less than the target upper limit amount (1714 dollars), the main CPU 41 displays a payout amount selection screen on the lower image display panel 6.

Here, the payout amount selection screen displayed on the lower image display panel 6 is described in detail with reference to FIG. 15.

As shown in FIG. 15, the payout amount selection screen comprises: a payout amount display part 92 for displaying the payout amount based on the standard payout amount at the time of shifting to the payout amount selection process (S18); a first alternative display part 96 for displaying an alternative of the payout amount based on the standard payout amount with the amount after tax, a second alternative display part 97 for displaying an alternative of the above-mentioned "special payout amount"; and a message display part 95 for displaying a message for urging the game player to select any one of the first alternative display part 96 and the second alternative display part 97.

The amount of payout at the time of shifting to the payout amount selection process (S18) and the amount after tax related to the amount of payout are displayed on the first alternative display part 96. On the other hand, a tax free limit (1199 dollars) specified as the "amount of special payout" is displayed on the second alternative display part 97. Here, the tax free limit specified as the "special payout amount" is a face value less than the minimum amount for tax liability (1200 dollars) as shown in FIG. 14 (for example, 1199 dollars).

Specifically, when the payout amount at the time of shifting to the payout amount selection process is "1500 dollars", "1500 dollars" which is the above-mentioned amount of payout calculated based on the standard payout amount, and "1050 dollars" which is the amount after tax for "1500 dollars" are displayed on the first alternative display part 96. Then, based on the "special payout amount" associated with a winning combination related to the standard amount of payout, "1199 dollars" which is the tax free limit is displayed on the second alternative display part 97 in this case.

Thus, since the payout amount (the amount to be paid) is displayed as the result of selection on both of the first alternative display part 96 and the second alternative display part 97, the game player can select the payout amount on his or her own free will.

After displaying the payout amount selection screen on the lower image display panel 6, the main CPU 41 shifts the processing to S44.

In S44, the main CPU 41 determines whether or not the first alternative display part 96 is operated. Specifically, the main CPU 41 holds the processing until an input signal is received from the touch panel 11. When the input signal is received, the main CPU 41 executes the above processing based on whether the input signal is transmitted from the touch panel 11 corresponding to the first alternative display part 96, or transmitted from the touch panel 11 corresponding to the second alternative display part 97.

When the input signal from the touch panel 11 relates to the first alternative display part 96 (S44: YES), the main CPU 41 sets the amount after tax related to the payout amount (S45). After setting the amount after tax to the amount to be paid, the main CPU 41 shifts the processing to S47.

In this regard, when it is determined that the amount of payout is greater than the target upper limit amount in S42, the main CPU 41 shifts to S45 without selecting the payout amount, and the amount after tax is set to the amount to be paid. Also in this case, after setting the amount after tax to the amount to be paid, the main CPU 41 shifts the processing to S47.

On the other hand, in S44, when the input signal from the touch panel 11 is determined to relate to the second alternative display part 97 (S44: NO), the tax free limit (1199 dollars) which is the "special payout amount" displayed on the second alternative display part 97 is set to the amount to be paid (S46). After setting the tax free limit to the amount to be paid, the main CPU 41 terminates the payout amount selection process (S18).

In S47 to which the processing is shifted after setting the amount after tax to the amount to be paid in S45, the main CPU 41 adds "1" to the value of a tax payment counter formed in the RAM 43. Since the tax payment counter counts when the amount after tax is set as an amount to be paid, the numerical value of the tax payment counter indicates the number of times of tax payment for the amount of payout in the slot machine 1. After adding "1" to the value of the tax payment counter, the main CPU 41 shifts the processing to S48.

In S48, the main CPU 41 determines whether or not the value of the tax payment counter is "5" with reference to the RAM 43. When the value of the tax payment counter is not "5" (S48: NO), the main CPU 41 terminates the payout amount selection process in that condition (S18). On the other hand, when the value of the tax payment counter is "5" (S48: YES), the main CPU 41 shifts the processing to S49.

Shifting to S49, the main CPU 41 resets the value of the tax payment counter to "0", and stores a free game flag in the RAM 43. Here, the free game flag stored in the RAM 43 is referred to in the processing of S11 of the next main game processing (S2), and serves as a condition for shifting to the free game process (S19) to be described later.

After resetting the tax payment counter and storing the free game flag in the RAM 43, the main CPU 41 terminates the payout amount selection process (S18).

Thus, in the gaming system 105 according to the present embodiment, the amount to be paid in the payout process (S20) produces a different result based on a selected result in the payout amount selection process (S18). When the amount after tax is set as the amount to be paid in the payout amount selection process (S18), the amount after tax is paid as the amount to be paid. In this case, since the payout is performed with the face value calculated by deducting the portion of the tax for the amount of payout, a receipt indicating that the tax is paid is printed from the ticket printer 30.

Therefore, by bringing this receipt to a prescribed place in the casino or the like, it is possible to judge whether or not the tax is paid, and it becomes unnecessary to go through a disparate procedure of tax payment during the game on the slot machine 1 for a long time. As a result, the game player can perform the tax payment procedure at arbitrary timing, and a game player's amusement is not damped by the tax payment procedure, and accordingly, the game player sufficiently savors the fascinating aspect of the slot machine 1.

On the other hand, when the second alternative display part 97 is selected, the tax free limit which is a smaller amount as compared with the amount of payout based on the winning combination is paid to the game player in the payout process (S20). When the tax free limit is paid to the game player, the amount actually paid to the game player is less than the minimum amount for tax liability, and there is no obligation to pay a tax. Therefore, it is not necessary to go through the tax payment procedure. As a result, since the disparate procedure of tax payment is not performed during the game execution, the fascinating aspect related to the game is not lost, and the game player can sufficiently savor the amusement of the slot machine 1.

Figure 17:
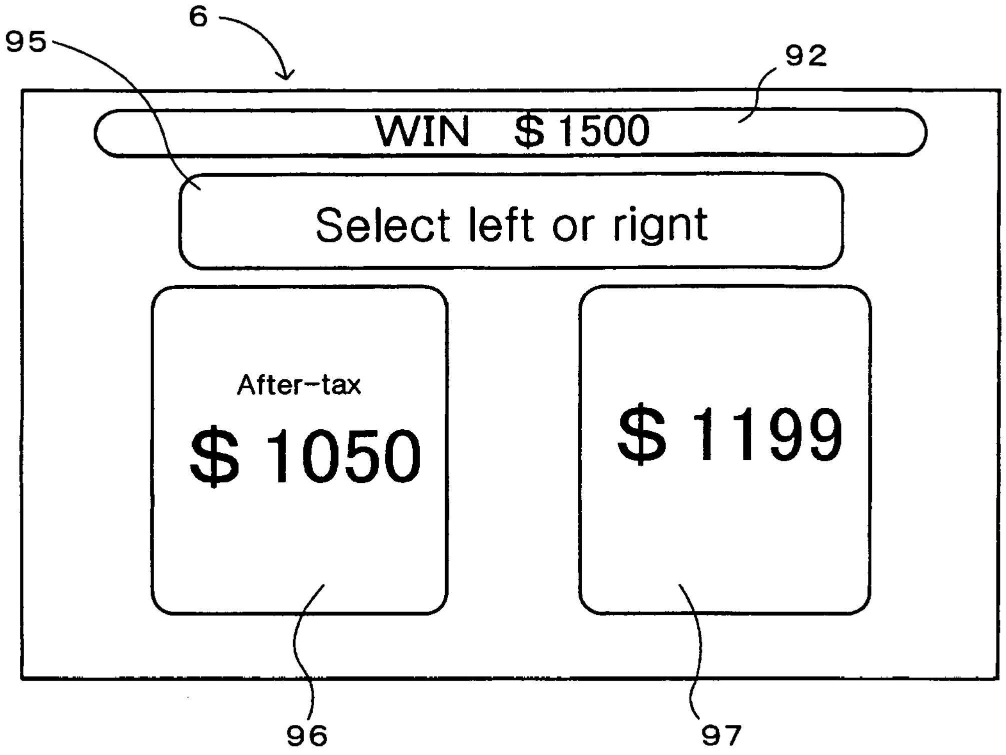
FIG. 17 shows an illustrative view (2) illustrating a display mode of the lower image display panel when a payout amount selection process is conducted.

In the above-mentioned payout amount selection screen, the amount of payout at the time of shifting to the payout amount selection process and the amount after tax related to the amount of payout are displayed on the first alternative display part 96 (refer to FIG. 15). However, as shown in FIG. 17, it is also possible to display only the amount after tax related to the amount of payout at the time of shifting to the payout amount selection process on the first alternative display part 96. In this case, the paid amount (the amount to be paid) as the result of selecting any one of the first alternative display part 96 and the second alternative display part 97 can be clearly grasped by visually recognizing the payout amount selection screen.

Figure 16:
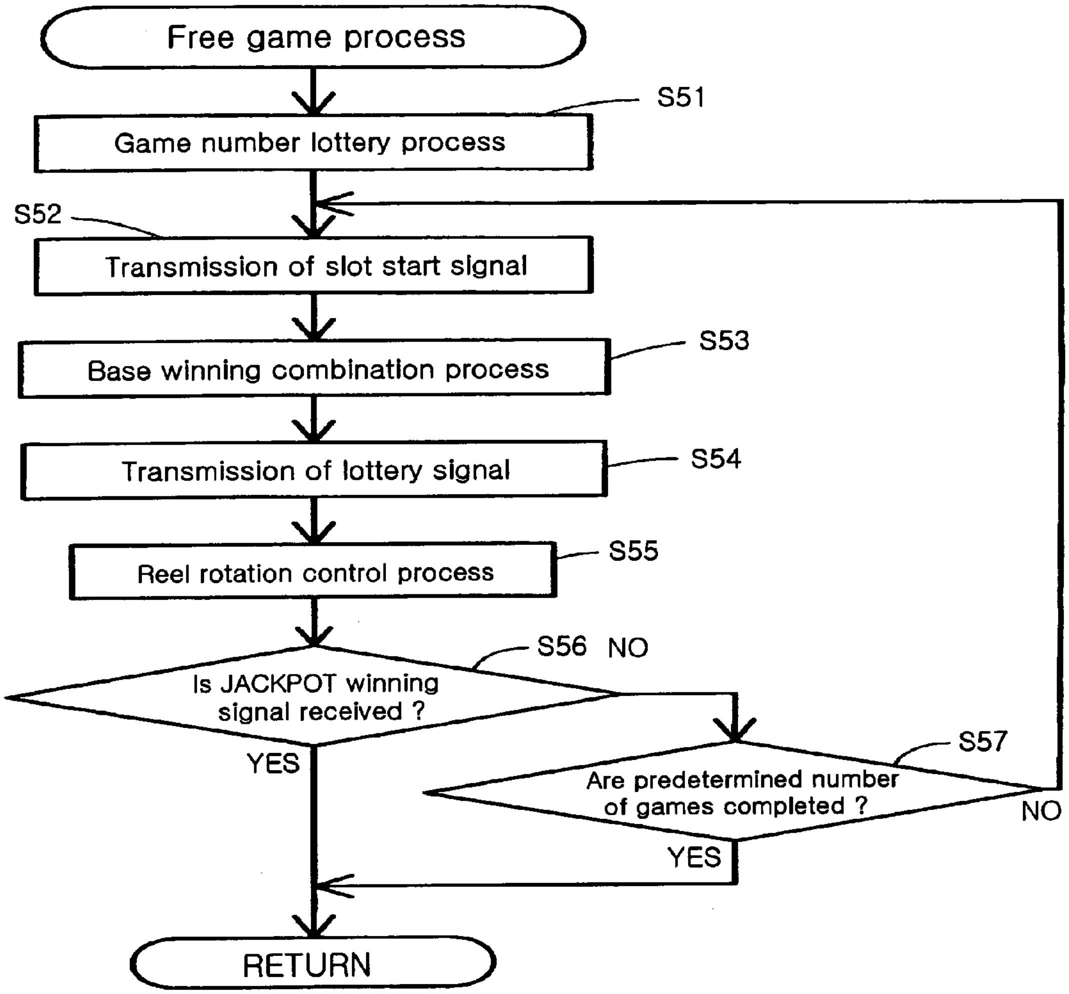
FIG. 16 shows a flowchart of free game process program in the slot machine according to the present embodiment.

Next, a free game process program executed in the free game process (S19) of the main game processing (S2) is described in detail with reference to the drawings. FIG. 16 is a flowchart of the free game process program.

If the free game flag is stored in the RAM 43 (S11: YES) when the processing is shifted to the main game process (S2), the main CPU 41 shifts to the free game process (S19), and executes the free game process program.

In the free game process (S19), the main CPU 41 first reads from the RAM 43 bet information on a bet in the slot game process (S14) executed immediately before, and then executes game frequency lottery process (S51). In the game frequency lottery process, the number of times of the free game (hereinafter referred to as a free game frequency) played without consuming credits is determined by lottery by using the bet number of the game played immediately before. Here, in the present embodiment, the free game frequency is limited to 1 to 5 times, and a predetermined random number value range is defined for each free game frequency. Therefore, when shifting to the game frequency lottery process (S51), the main CPU 41 determines one random number value by using the random number generation program. Accordingly, the free game frequency is determined from the determined one random number value. After storing the determined free game frequency in the RAM 43, the main CPU 41 shifts the processing to S52.

In S52, the main CPU 41 transmits the slot start signal to the server 100. In this regard, in the free game processing (S19), the game is played without consuming the credit, and the bet information is not transmitted unlike S21 of the above-mentioned slot game process (S14). After transmitting the slot start signal to the server 100, the main CPU 41 shifts the processing to the base winning combination lottery process (S53).

Here, the contents of the base winning combination lottery process (S53), the transmission of lottery result data (S54), and the reel rotation control process (S55) in the free game process (S19) are the same as the contents of the base winning combination lottery process (S22), the transmission of the lottery result data (S23), and the reel rotation control process (S24) in the above-mentioned slot game process. Since the contents are described in the slot game process (S14), the description thereof is omitted here.

After terminating the reel rotation control process (S55), the main CPU 41 shifts the processing to S55.

In S56, the main CPU 41 determines whether or not the JACKPOT winning signal is received from the server 100. When the JACKPOT winning signal is received (S56: YES), the main CPU 41 terminates the free game process (S19) because of the winning of JACKPOT even if the free game frequency determined in the game frequency lottery process (S51) remains. At this time, the values of the free game frequency and the game frequency counter stored in the RAM 43 are reset. On the other hand, when the JACKPOT winning signal is not received (S56: NO), the main CPU 41 shifts the processing to S57.

In S57, the main CPU 41 determines whether or not the game for the free game frequency is finished. Specifically, the main CPU 41 adds "1" to the game frequency counter stored in the RAM 43, and determines whether or not the value of the game frequency counter reaches the free game frequency determined in the game frequency lottery process (S51), thereby making the above determination. When the value of the game frequency counter reaches the free game frequency (S57: YES), the free game processing (S19) is terminated in that condition. At this time, the values of the free game frequency and the game frequency counter stored in the RAM 43 are reset. On the other hand, when the value of the game frequency counter does not reach the free game frequency (S57: NO), the main CPU 41 returns the processing to S52 to execute the free games for the following game frequency.

In this regard, although the total amount of payout given in the free game is to be paid in the payout process (S20) to which the free game process (S19) is shifted, when the total amount of payout is equal to or more than the minimum amount obliging tax payment (for example, 1200 dollars), the amount after tax related to the total amount of payout is paid.

As described above, in the gaming system 105 according to the present embodiment, the bet information is transmitted to the server 100 whenever a game is played on the slot machine 1 (S21), and an additional amount corresponding to the specified proportion of the bet information (for example, 1% to 5%) is accumulated in each of the standard accumulated amount and the amount of special payout which are the accumulated JACKPOT amount stored in each storage area of the accumulated JACKPOT amount storage area 103A (S102). Then, when one of the five winning combinations such as the combination of "JACKPOT 7" is won in the base winning combination lottery process (S22 and S53) of the slot machine 1, or when the JACKPOT lottery process (S104) of the server 100 is won, the JACKPOT accumulated amount (the standard accumulated payout amount and the special payout amount) stored in the storage area corresponding to the relevant condition of the JACKPOT accumulated amount storage area 103A is given as the amount of payout to the winning slot machine 1. Accordingly, the opportunity for the high amount of payout is provided to the game player, and a sense of expectancy for the high amount of payout can be provided to the game player.

Further, when one of the five winning combinations such as the combination of "JACKPOT 7" is won, or when the JACKPOT lottery process (S104) of the server 100 is won, at the point of time when the JACKPOT accumulated amount (the standard accumulated payout amount and the special payout amount) is given, each JACKPOT accumulated amount (the standard accumulated payout amount and the special payout amount) stored in each storage area of the JACKPOT accumulated amount storage area 103A is reset by the server control process program (S108). Accordingly, time which a casino manager consumes for a management operation related to the gaming system 105 can be reduced based on the winning JACKPOT. That is, since it is possible to reduce time for which the game player during game play cannot but stop the game, the loss of the interest of the game player during game play can be prevented.

Figure 18:
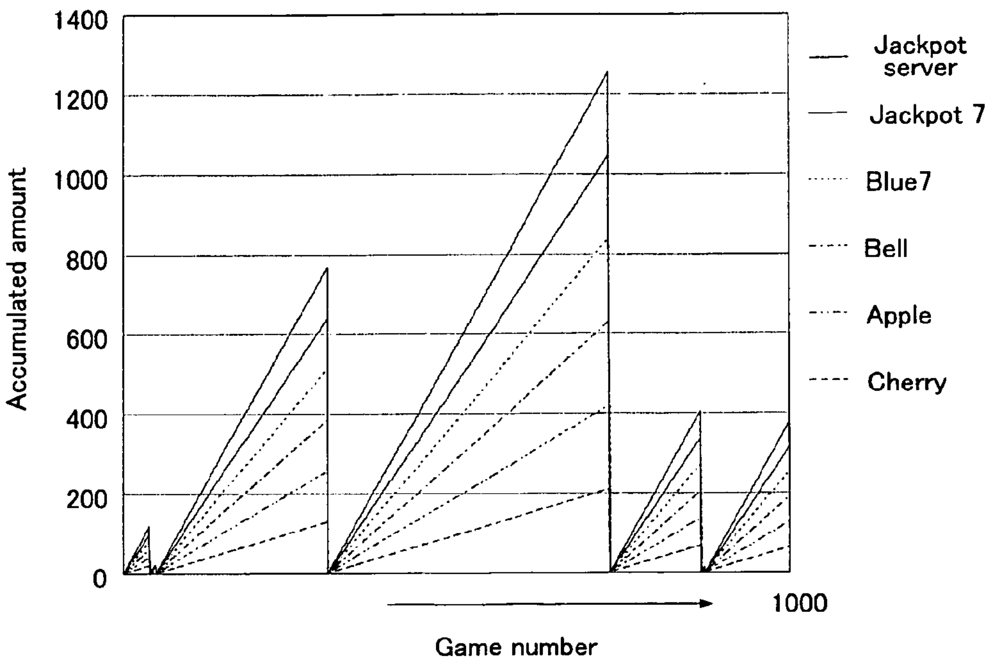
FIG. 18 is a graph showing a simulation result of accumulated amounts of game media for five kinds of progressive JACKPOT as a function of the numbers of game at each gaming machine. The amounts are reset at once when any one of the Jackpots is won.
Figure 19:
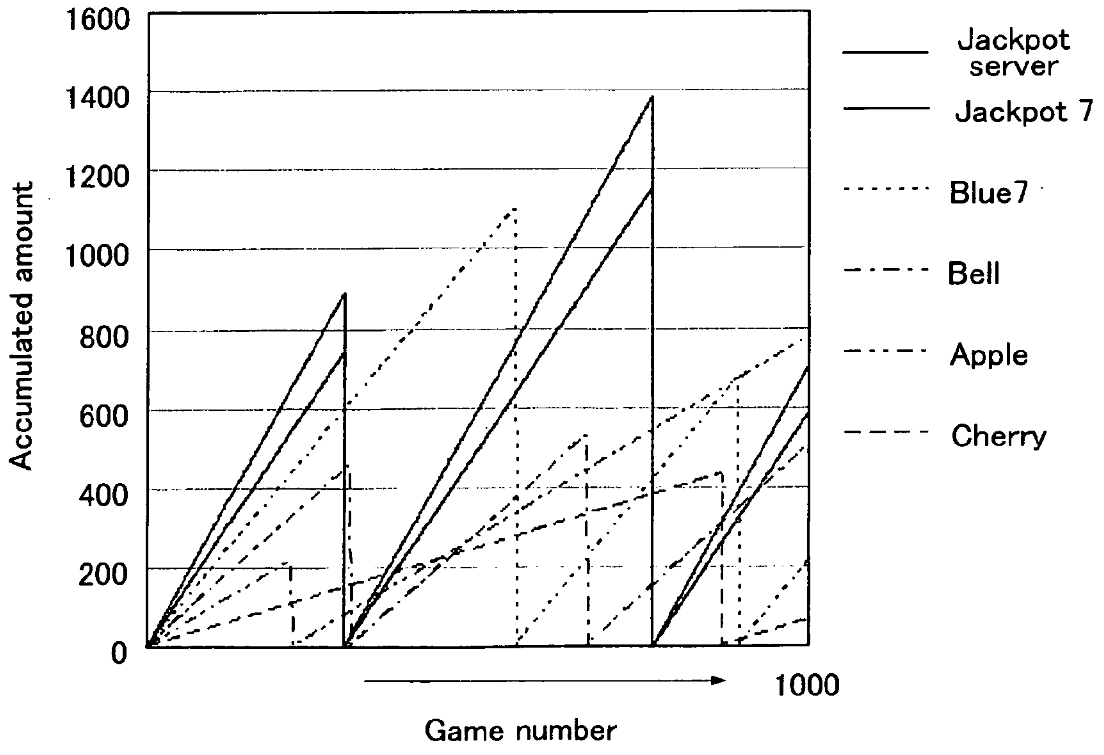
FIG. 19 is a graph showing a simulation result of accumulated amounts of game media for five kinds of progressive JACKPOT as a function of the numbers of game at each gaming machine. The amounts are reset respectively when each kind of the Jackpots is won.

FIGS. 18 and 19 show graphs in which amounts of game media accumulated for the JACKPOT are plotted against the number of games. FIG. 18 shows a case in which all accumulated amounts are reset if any one of the five kinds of JACKPOTs is won. On the other hand, FIG. 19 shows a case in which the accumulated amounts are reset respectively if any corresponding JACKPOTs are won. These simulations were conducted under the following assumption.

1. Common Assumption (1) Accumulation Rate

The bet information of Five (5), four (4), three (3), two (2), and one (1) percent of bet game media is cumulatively added to each storage area of the respective five kinds of JACKPOTs (JACKPOT 7, BLUE 7, BELL, APPLE, CHERRY). As for the JACKPOT process (FIG. 9, S104) by the server 100, the area 103A1 for JACKPOT 7 can be utilized. However, six (6) percent of the bet number is added cumulatively to the accumulated amount, which is stored in the storage area 103A6 (FIG. 4B).

(2) Subject Games

Only base winning combination lottery process (S22) and JACKPOT lottery process (S104) are subject to the simulation.

(3) Coordination with Gaming Machines

One server and ten gaming machines are capable of communicating with each other. In these gaming machines, five (5)

bets are bet for each game and each gaming machine conducts the lottery repeatedly in a synchronized manner.

(4) Accumulated Amount is Monitored.

2. Individual Assumption (1) In FIG. 18, all the accumulated amounts are reset (become zero) once any one of the JACKPOTs is won.

(2) In FIG. 19, only the accumulated amount of one kind of JACKPOT, which is won, is reset. In the JACKPOT lottery process (S104) of the server (S104), it may be categorized in the same kind as JACKPOT 7 and the accumulated amount of JACKPOT 7 is reset if either is won.

In FIG. 18, it can be seen that five JACKPOTs were won during about 1000 times of the game plays. The highest payout amount can be made by the JACKPOT lottery process (FIG. 9, S104) by the server 100, and respective kinds of JACKPOT (JACKPOT 7, BLUE 7, BELL, APPLE, CHERRY) may provide higher payout amounts in this order. However, it is not understood that which kind of JACKPOT was actually. This is because all the accumulated amounts were reset no matter which kind of JACKPOT was won. That is, even though the same reset was made, the actual payout amount for winning the JACKPOT might vary. It is generally made that a higher winning probability is assigned to a winning combination with a lower payout rate (see FIG. 8) and it becomes unlikely that the JACKPOT with a high payout amount is won such that the enjoyment to obtain such JACKPOT is extremely high.

In FIG. 19, Since each accumulated amount for each kind of JACKPOT is reset independently, the payout amount for the winning combination depends not only on the kind of JACKPOT, but also on a period of time of the accumulation. For example, the JACKPOT by the server has as high as 6% of accumulated speed, but it was won around 200th time and the accumulated amount was about 900. On the other hand, the winning combination of BLUE 7 has four (4) percent of accumulation rate so as to have a little less. However, the winning combination of BLUE 7 was won around 500th time and the accumulated amount was about 1100.

If compared to FIG. 18 overall, winning the JACKPOTs may not have only one simple wave as a whole, but various kinds of JACKPOTs were won individually at every individual timing. Therefore, FIG. 18 shows more harmonized gaming system comprising: a server and ten gaming machines on the whole.

When the amount of payout is given as the results of the base winning combination lottery process (S22) and the JACKPOT lottery process (S104), the double-up game process (S16) is executed, and the opportunity for taking the high amount of payout is further provided. Accordingly, even in the case of winning the base winning combination with a low payout, or in the case the accumulated JACKPOT amount is small, the opportunity for taking a high amount of payout can be provided to the game player, and the amusement related to the game can be improved.

Then, when the amount of payout reaches the minimum amount for tax liability or more after executing the double-up game, the amount to be paid can be selected, in the payout amount selection process (S18), from the "amount after tax based on the standard payout amount" and the "tax free limit which is the special payout amount" by operating one of the first alternative display part 96 and the second alternative display part 97.

That is, since the game player can select the payout amount on his or her own free will, it is possible to relieve the feelings of inequality of the game player in the state where the game player can receive only a payout equal to or less than the minimum amount for tax liability as the result of tax payment for the amount to be paid although the game player wins the amount of payout equal to or more than the minimum amount obliging tax payment.

When the "amount of tax paid payout based on the standard amount of payout" is paid as the paid amount in the payout process (S20) as the result of the payout amount selection process (S18), the amount after tax from which the tax due based on the amount of payout is already collected is paid, and the receipt related to the tax payment is printed from the ticket printer 30. Therefore, it becomes unnecessary to do the tax payment procedure during game execution. As a result, since a disparate work of tax payment procedure does not intervene in the game, the loss of the amusement related to the slot machine 1 can be prevented.

When the amount after tax is paid as the amount to be paid, the free game can be played according to the value of the tax payment counter stored in the RAM 43. That is, since such an advantage that the game player can play the free game is provided when the game player pays the tax, it is possible to relieve the dissatisfaction of the game player who receives only the amount after tax lower than the standard payout amount.

Although the amount after tax of the first alternative display part 96 becomes lower than the "special payout amount" of the second alternative display part 97 as a result of the tax payment, the worth of selection related to the first alternative display part 96 and the second alternative display part 97 can be made substantially equal by providing the advantage of the execution of the free game. As a result, it is possible to prevent a situation in which only one alternative is frequently selected. In particular, in the case of the present embodiment, a situation in which only the second alternative display part 97 from which a payout higher than the amount after tax is paid is selected can be prevented, and thus it is possible to secure also the case where the tax is paid by selecting the first alternative display part 96.

On the other hand, when the tax free limit which is the "special payout amount" is paid in the payout process (S20) as the amount to be paid based on the selection of the second alternative display part 97, the tax free limit is the payout amount, and thus the tax payment procedure itself becomes unnecessary. That is, since the disparate work of tax payment procedure does not intervene in the game, the game having the amusement related to the slot machine 1 can be continued without doing the tax payment procedure. Thus, the game player can savor the fascinating aspect of the game while maintaining excitement caused by obtaining the high amount of payout without spoiling fun by doing the disparate work of tax payment procedure. Since at least the payout of the tax free limit can be received by the game player's own selection, the game player's feelings of inequality can be relieved.

The present invention is not limited to the above examples, and as a matter of course, various improvements and modifications can be made within the scope without departing from the scope of the present invention.

For example, in the present embodiment, the gaming system 105 is formed of the plurality of slot machines 1 and the server 100. However, the gaming machine used for the gaming system 105 is not limited to the gaming machine of the present embodiment, and for example, it is also possible to use card gaming machines for poker, blackjack, and the like.

The scale of the gaming system 105 is not limited to a scale in a game store, and for example, it is also possible to form the gaming system 105 of slot machines 1 installed in a plurality of stores in a certain area and a server 100.

Further, in the gaming system 105 according to the present embodiment, the JACKPOT lottery process (S103) is executed in the server 100 as a lottery independent of the base winning combination lottery process (S14). However, this may be executed in the slot machine 1, and it is also possible to provide the accumulated JACKPOT amount based on only the lottery result of the base winning combination lottery process (S14) without executing the JACKPOT lottery process (S103) concerned.

Then, in the gaming system related to the present embodiment, in the case of the amount of payout which requires the tax payment, the face value after collecting the tax for the amount of payout is paid as the amount to be paid, and the receipt is printed with the ticket printer 30. However, the present invention is not limited to this mode, and it is also possible to adopt a configuration allowing the game player to do the tax payment procedure. Although the tax payment procedure in this case is preferably a procedure to be promptly completed, it is also possible to call an attendant of the casino or the like to directly do the tax payment procedure, and also possible to do the tax payment procedure to the slot machine 1 (for example, refer to Japanese published unexamined application No. 2005-168755).

Further, in the present embodiment, the winning amount of payout and the amount after tax related to the amount of payout are displayed on the first alternative display part 96, and the tax free limit is displayed on the second alternative display part 97. However, in addition to this, it is also possible to provide a balance amount display part for displaying a balance amount with the amount of payout on each of the first alternative display part 96 and the second alternative display part 97. In this case, the balance amount between the amount of tax paid payout and the amount of payout is displayed on the balance amount display part of the first alternative display part 96, and the balance amount between the tax free limit and the amount of payout is displayed on the balance amount display part of the second alternative display part 97. Thereby, the game player can intuitively grasp how many gains can be obtained when the game player selects one of the balance amount as the paid amount.

It is also possible to constantly perform the display in the balance amount display part in the payout amount selection process (S18), or to start the display according to a predetermined operation (for example, input from the button or the touch panel)

Then, in the present embodiment, when the first alternative display part 96 is selected five (5) times in the payout amount selection process (S18), the free game flag is set based on the five times of tax payment, and the advantage of executing the free game processing (S19) in the next game is provided. However, the present invention is not limited to this mode. For example, it is also possible to reduce or increase the number of times of tax payment (the selection of the first alternative display part 96).

The extraordinary gain given to the tax payment may not be the mode of the "free game". For example, it may be configured such that a "second game" having different game contents is played, a specified amount of credits is paid, or premiums are offered, and so on.

In the present embodiment, two kinds of amounts of payout, the "base payout amount" and the "special payout amount", are associated with one winning combination. However, many kinds of amounts of payout may be associated with the one winning combination. Moreover, in the present embodiment, the "special payout amount" of all the winning combinations is set to 1199 dollars which is the tax free limit. However, it is also possible to set the amount of special payout for each winning combination to a different face value as long as the amount of special payout is less than the tax free limit. For example, it is also possible to set the amount of special payout related to the combination of "JACKPOT 7" to "1199 dollars", and the amount of special payout related to "BLUE 7", "BELL", "APPLE", and "CHERRY" to "1099 dollars", "999 dollars", "899 dollars", and "799 dollars", respectively.

Further, in the present embodiment, the server 100 performs the accumulation of the specified amount in the JACKPOT accumulated amount storage area 103A, the JACKPOT lottery process (S104), and the reset process (S108) of the accumulated JACKPOT amount storage area 103A. However, it is also possible to allow the slot machine 1 to perform all the processing. In this case, even the gaming machine alone can prevent the loss of the interest of the game player during game play on the gaming machine, and the same effect as gaming system 105 of the above embodiment can be produced.

Further, a gaming machine and a game system as described below may be provided in accordance with the present invention.

When a high payout amount is won wherein a tax payment is necessary, it is possible to conduct a quick process and it is possible to diminish a degree of lowering amusement of the game, but the amusement is still lowered. That is, even though the tax payment procedure is conducted very quickly, the player's excited feeling must be lowered when a different kind of work such as tax payment intervenes in the middle of exciting game.

Further, the payout amount that the game player may obtain is deeply affected around the reference payout amount, which is the upper limit of tax free payout amount.

For example, suppose the payout amount is $1200 or more, then 30% of tax rate is imposed to the payout amount. If the payout amount of $1199 is won, the game player actually gets $1199 and no tax payment is required while the payout amount of $1200 is won such that $360 is deducted from the $1200 and the player will get $840 net. Therefore, one dollar difference makes $359 difference in reality.

In addition to the tax payment procedure, such a difference is realized and the game player may have an inequality feeling so that the amusement of the game may be reduced a lot. In particular, if the payout amount a little bigger than the reference payout amount, this inequality feeling may become much stronger.

After paying the high amount of payout, the maintenance work (for example, the accumulated payout amount may be initialized in the gaming machine) intervenes such that the game player may lose the interest and quit the game as triggered by such maintenance work.

When the high amount of payout with the tax liability is won, the game player must process the tax payment and the amusement of the game may be lowered.

Also, if the gaming system employing a plurality of accumulating additional means (so-called JACKPOT) is configured such that if one of the plurality of kinds of accumulating additional means is won, the game player is awarded for the one.

Here, when the one of five (5) accumulating additional means is won, only the one out of the five accumulating additional means is usually reset.

A gaming system is provided such that the gaming system comprises: a gaming machine (e.g., slot machine 1) and a server (e.g., server 100). The gaming machine comprises: a receiving unit (e.g., coin counter 21C, reverter 21S, and so on); a second lottery unit (e.g., main CPU 41, a random number generator, and so on) for conducting a lottery to select a winning combination. The server comprises a plurality of first storage devices (e.g., storage areas 103A1 to 103A6 implemented in the accumulated JACKPOT amount storage area 103A); a first lottery unit (e.g., server CPU 101; S104, a random number generator, and so on) for conducting a lottery; a first processor (e.g., server CPU 101, S107) for sending an instruction signal. The gaming machine is connected to the server so as to be capable of communicating with the server. The first processor (e.g., server CPU 101, S108) is capable of resetting the plurality of accumulated amounts stored in the plurality of first storage devices.

The above gaming system (e.g., gaming system 105) has the following features. The gaming machine (e.g., slot machine 1) comprises a display (e.g., lower image display panel 6) that shows a result of a lottery conducted by the second lottery unit (e.g., main CPU 41, a random number generator, and so on), a second storage device (e.g., ROM 42, RAM 43) for storing a standard accumulated payout amount, and a special amount having a tax free upper limit. The display displays a first display part (e.g., first alternative display part 96) and a second display part (e.g., second alternative display part 97). The payout amount is determined based on a selection of one of the first display part and the second display part.

The above gaming system (e.g., gaming system 105) is characterized in that the second processor (e.g., main CPU 41, S43) operates to cause the display to display the payout amounts after tax in the first display part (e.g., first alternative display part 96) when the standard payout amount is equal to or more than the tax free limit amount based on a result of a lottery conducted by the first lottery unit (e.g., server CPU 101; S104, a random number generator, and so on).

The gaming system (e.g., gaming system 105) as described above is characterized in that the second processor (e.g., main CPU 41, S43) operates to cause the display to replace the standard accumulated payout amount displayed in the first display part (e.g., first alternative display part 96) with the payout amount after tax when the standard accumulated payout amount is equal to or more than the tax free limit amount.

The gaming system (e.g., gaming system 105) as described above is characterized in that the gaming machine comprises the second processor (e.g., main CPU 41, S1, S19) operates to provide a predetermined benefit to the game player when the first display part (e.g., first alternative display part 96) is selected via the selection device.

The gaming system (e.g., gaming system 105) as described above wherein the gaming machine may comprise a payout device (e.g., main CPU 41, ticket printer 30, hopper 66, and so on) for paying a payout amount based on the result of the lottery conducted by the first lottery unit.

In the gaming system, the gaming machine comprises a receiving unit for receiving game media. The received game media are utilized to pay out a payout amount based on the lottery result. And according to the result of the lottery conducted by any one of the first lottery unit and the second lottery unit, the payout instruction signal is sent to a corresponding gaming machine. And the plurality of payout amounts stored in the plurality of first storage devices are reset when one of the plurality of payout amounts is paid out.

In this way, the manager at the casino or the like does not have to conduct a reset operation to all first storage devices. Thus, in the gaming system, it is possible to reduce a period of time for conducting the management. That is, it is possible to reduce the period of time when the game player has to stop playing the game.

In the gaming system, when the payout instruction is transmitted based on the result of the lottery conducted by any one of the first lottery unit and the second lottery unit, the second processor operates to cause the display to display the first display part and the second display part. When any one of first display part and second display part is selected by the selection device, any one of the standard accumulated payout amount displayed in the first display part and the special payout amount displayed in the second display part is paid out based on the payout instruction transmitted from the server.

In this way, the game player winning the face amount more than the minimum limit for the tax liability can select the amount displayed in any one of the first display part and the second display part. That is, the game player may not have an inequality feeling because of the tax payment.

Also, when the second display part is selected, the tax payment is not necessary so that the tax payment procedure does not intervene the game play. That is, the game execution is not interrupted and it is possible to prevent from lowering the desire of the game player to continue to play the game.

Also, in the gaming system, when the standard accumulated payout amount is more than the minimum limit for the tax liability based on the lottery result of the first lottery unit, the second processor operates to cause the display to display the payout amount after tax in the first display part. As a result, since the game player can recognize the payout amount after tax, it is possible for the game player to select what he wishes.

Also, in the gaming system, when the standard accumulated payout amount is more than the minimum limit amount for tax liability based on the lottery result by any one of the first lottery unit and the second lottery unit, the standard accumulated payout amount displayed in the first display part is replaced with the payout amount after tax.

Thus, the game player can recognizes the payout amount after tax before selection by the selection device. In this occasion, only the amount after tax is displayed in the first display part so that no confusion would occur in the amount. As the result, it is possible to grasp firmly that the amount the player can obtain when the first display part is selected.

In the gaming system, when the first display part is selected by the selection device, the second processor may operate to provide a predetermined benefit to the game player. Thus, if compared to the case that the second display part is selected, the special benefit can be provided when the payout amount after tax is paid out. Thus, as the result of selection of one of the first display part and the second display part, the benefits to be provided to the game player can be about the same. Therefore, as the game player selects one of the first display part and the second display part, it is possible to avoid biased selection. As the result, it is possible to prevent the game player from selecting only the tax free payout such that the tax is fairly paid.

Also, in either selection, the benefit provided to the game player is about the same such that the inequality feeling may be avoided. Further, the game player may enjoy more sophisticated "selection".

What is claimed is:

1. A gaming system, comprising:

a gaming machine; and a separately installed server capable of communicating with the gaming machine, wherein the gaming machine comprises:

a receiving unit for receiving a game medium;

wherein the server comprises:

a plurality of first storage devices for storing a plurality of accumulated amounts to which a predetermined proportion of bet game media received by the receiving unit is cumulatively added;

a first lottery unit for conducting a lottery to determine whether or not one of the accumulated amounts that are stored in the plurality of first storage devices is to be paid; and a first processor that operates to:

transmit information of the one of the accumulated amounts stored in the plurality of first storage devices based on a result of the lottery conducted by the first lottery unit; and reset all accumulated amounts stored in the plurality of first storage devices when the information of the one of the accumulated amounts stored in the first storage devices is transmitted based on the result of the lottery conducted by the first lottery unit, wherein the gaming machine further comprises:

a second lottery unit for conducting a lottery to select a winning combination, a payout amount to be paid out being determined based on a result of the lottery conducted by the second lottery unit;

a display for displaying the result of the lottery conducted by any of the first lottery unit and the second lottery unit;

a second storage device for storing, as the payout amount, a standard accumulated payout amount and a special payout amount sent from the server; and a second processor that operates to:

cause the display to simultaneously display a first display part indicating the standard accumulated payout amount stored in the second storage device, the standard accumulated payout amount being subject to tax deduction, and a second display part indicating the special payout amount being not subject to tax deduction, based on the result of the lottery conducted by any of the first lottery unit and the second lottery unit;

determine the payout amount based on a player selection of one among the first display part and the second display part; and provide a right to play a free game in a next game when the first display part is selected and a predetermined condition is satisfied.

2. The gaming system according to claim 1, wherein the second processor operates to cause the display to display a payout amount after tax which is an amount given by subtracting a tax amount of the predetermined tax rate from the standard accumulated payout amount in the first display part when the standard accumulated payout amount based on the result of the lottery conducted by the first lottery unit is equal to or more than the minimum limit amount for tax liability.

3. The gaming system according to claim 1, wherein the second processor operates to provide a game player with a predetermined benefit when the first display part is selected.

4. The gaming system according to claim 1, wherein the gaming machine comprises a communication interface which transmits to the server the result of the lottery conducted by the second lottery unit in association with identification information of the gaming machine.

5. The gaming system according to claim 1, wherein the gaming machine comprises a payout device for paying out a payout amount based on the result of the lottery by any of the first lottery unit and the second lottery unit.

6. The gaming system according to claim 1, wherein one among the first display part and the second display part is selected after a payout amount to be paid out is determined.

7. The gaming system according to claim 1, wherein the gaming machine is one of a plurality of gaming machines, and wherein the server is configured to communicate with each of the plurality of gaming machines such that the server is configured to conduct the lottery for the accumulated amounts from each of the plurality of gaming machines and each of the plurality of gaming machines is configured to conduct the lottery for the winning combination.

8. A gaming machine, comprising:

a receiving unit for receiving a game medium;

a first lottery unit for conducting a lottery to select a winning combination, a payout amount to be paid out being determined based on a result of the lottery conducted by the first lottery unit;

a communication interface for transmitting a result of the lottery conducted by the first lottery unit to a separately installed server, the server including a second lottery unit configured to conduct a lottery to determine whether or not one of the accumulated amounts that are stored in a plurality of first storage devices is to be paid, and for receiving a result of the lottery conducted by a second lottery unit;

a display for displaying the result of the lottery conducted by any of the first lottery unit and the second lottery unit;

a second storage device for storing, as the payout amount, a standard accumulated payout amount and a special payout amount sent from the server; and a processor that operates to:

cause the display to simultaneously display a first display part indicating the standard accumulated payout amount stored in the second storage device, the standard accumulated payout amount being subject to tax deduction, and a second display part indicating the special payout amount being not subject to tax deduction, based on the result of the lottery conducted by any of the first lottery unit and the second lottery unit;

determine the payout amount based on a player selection of one among the first display part and the second display part; and provide a right to play a free game in a next game when the first display part is selected and a predetermined condition is satisfied.

* * * * *